United States Patent
Roach, Jr.

(10) Patent No.: US 7,460,857 B2
(45) Date of Patent: Dec. 2, 2008

(54) METHOD AND APPARATUS FOR PROVIDING INFORMATION IN RESPONSE TO A DELAYED GRANT OF SUBSCRIBER PERMISSION

(76) Inventor: Peter O. Roach, Jr., 1150 Ives Ct., Atlanta, GA (US) 30319

(*) Notice: Subject to any disclaimer, the term of this patent is extended or adjusted under 35 U.S.C. 154(b) by 314 days.

(21) Appl. No.: 11/336,380

(22) Filed: Jan. 20, 2006

(65) Prior Publication Data
US 2006/0166648 A1 Jul. 27, 2006

Related U.S. Application Data

(60) Provisional application No. 60/645,687, filed on Jan. 21, 2005, provisional application No. 60/723,702, filed on Oct. 5, 2005.

(51) Int. Cl.
*H04Q 7/20* (2006.01)
(52) U.S. Cl. .......... 455/411; 455/410; 455/412.1; 455/414.1
(58) Field of Classification Search .......... 455/410, 455/411, 412.1, 412, 2, 414.1
See application file for complete search history.

(56) References Cited

U.S. PATENT DOCUMENTS

| | | | |
|---|---|---|---|
| 6,311,069 B1 | 10/2001 | Havinis et al. | |
| 6,529,491 B1* | 3/2003 | Chang et al. | 370/335 |
| 6,687,504 B1 | 2/2004 | Raith | |
| 6,687,505 B1 | 2/2004 | Hägebarth | |
| 6,928,291 B2 | 8/2005 | Yiu et al. | |
| 7,039,427 B2* | 5/2006 | Tachikawa | 455/457 |
| 7,149,536 B2* | 12/2006 | Lee | 455/462 |
| 7,299,039 B2* | 11/2007 | Lee et al. | 455/426.1 |
| 2001/0041592 A1 | 11/2001 | Suonpera et al. | |
| 2002/0019225 A1 | 2/2002 | Miyashita | |
| 2002/0077897 A1 | 6/2002 | Zellner et al. | |
| 2003/0078993 A1 | 4/2003 | Hull et al. | |
| 2003/0109248 A1 | 6/2003 | Lewis | |
| 2003/0181205 A1 | 9/2003 | Yiu et al. | |
| 2004/0166832 A1 | 8/2004 | Portman et al. | |

(Continued)

FOREIGN PATENT DOCUMENTS

EP 1357727 10/2003

OTHER PUBLICATIONS

Wyty, LLC, "Wyty.com is a Free On-line Mobile Phone Directory," Wyty Next Generation Directory, © 2004, Jan. 12, 2006, http://www.wyty.com/AboutUs.aspx, pp. 1-2.

Fernandes, "IITians Develop Linux-Based Cell Phone Tracking Software," CXOtoday.com Business News for Technology Buyers, Aug. 16, 2005, http://cxotoday.com/cxo/jsp/article.jsp?article_id=2538&cat_id=911, pp. 1-2.

(Continued)

*Primary Examiner*—CongVan Tran
(74) *Attorney, Agent, or Firm*—King & Spalding

(57) ABSTRACT

A grant of permission is operative to release the personal information of a user, such as mobile subscriber of a mobile telephone network, prior to transmitting that information to a requesting party. If the permission grant is delayed, however, the delivery of the mobile subscriber's information can be provided at a later time to the requesting party if the mobile subscriber subsequently grants permission. The requesting party can receive information relevant to the mobile subscriber via text message, e-mail, or other conventional media in response to the delayed permission grant. The mobile subscriber can grant a delayed release of the information or contact the requesting party directly without revealing the requested information.

21 Claims, 14 Drawing Sheets

U.S. PATENT DOCUMENTS

| | | |
|---|---|---|
| 2004/0192299 A1 | 9/2004 | Wilson et al. |
| 2004/0192340 A1 | 9/2004 | Brem et al. |
| 2004/0199402 A1 | 10/2004 | Walker et al. |
| 2005/0041793 A1 | 2/2005 | Fulton et al. |
| 2005/0283614 A1 | 12/2005 | Hardt |
| 2006/0040677 A1 | 2/2006 | Dietrich et al. |
| 2006/0046742 A1* | 3/2006 | Zhang .................... 455/456.2 |
| 2007/0021111 A1 | 1/2007 | Celik |
| 2007/0054739 A1 | 3/2007 | Amaitis et al. |

OTHER PUBLICATIONS

He et al., "The Quest for Personal Control Over Mobile Location Privacy," Consumer Communications and Network Series, May 2004, IEEE Communications Magazine, pp. 130-136.

Pepper et al., "Bellcore's CallManager System," Sep. 30 - Oct. 1, 1996; Interactive Voice Technology for Telecommunications Applications, 1996 Proceedings; pp. 49-52.

* cited by examiner

METHOD AND APPARATUS FOR PROVIDING INFORMATION IN RESPONSE TO A DELAYED GRANT OF SUBSCRIBER PERMISSION

RELATED APPLICATIONS

The present application is related to the subject matter disclosed by and claims priority under 35 U.S.C. 119 to U.S. Provisional Patent Application Ser. No. 60/645,687, filed Jan. 21, 2005, entitled "Methods and Apparatuses for Providing User Authorized Contact Information for a Cellphone Subscriber," and U.S. Provisional Patent Application Ser. No. 60/723,702, filed Oct. 5, 2005, entitled "Methods and Apparatuses for Providing Directory Information Following the Receipt of Delayed Granting of Subscriber Permission." Applicant hereby incorporates by reference the complete disclosure of each of said referenced provisional patent applications.

TECHNICAL FIELD

The present invention relates generally to wireless networks and more particularly to the offering of directory assistance for mobile subscribers post receiving the mobile subscriber's permission to release the information. The invention allows the called party to grant or deny permission to release the relevant information to the requesting party as well as providing the relevant information to the requesting party in the event the subscriber's permission is delayed.

BACKGROUND OF THE INVENTION

Currently a large percentage of the population own and use a cellular phone, mobile telephone, voice over wireless IP, or other wirelessly connected communications device (hereafter referred to as a mobile subscriber) as their primary method of communication. While the mobile connection is extremely useful for instant communications and accessibility, many mobile subscribers do not wish to publish their number in a directory or allow an information services provider, such as, the directory assistance operator, to have ready access to or disseminate their contact information. The mobile subscriber may desire to limit this access due to numerous reasons; e.g., privacy, limit access from telemarketers, recent changes in their life status, or a plethora of other reasons.

Currently directory assistance operators use a telephone number database to provide the information services and usually the service is billed to the calling or requesting party's telephone bill. Typically the directory assistance databases are hours, days, weeks or even months old. The directory assistance usually does not provide any information indicating who is allowed to access the directory listing or any restrictions as to the use and dissemination of the subscriber's directory information. Since the directory assistance system is typically an "all or nothing" proposition, this opens up the possibility for abuse of this database or for use of the directory assistance information in a manner that may be adverse to the mobile subscriber's best interest at the time a directory request is made.

There are two major reasons the mobile subscriber user may wish to restrict certain parties' access to their contact information in real-time. The first being the ready access the mobile phone service provides to the user. Since most users usually carry their mobile phone with them, they can be easily contacted at any time and place using their mobile phone. Today the user can limit this access to callers who they have given their mobile phone number or to others who are trusted by the user at the current time. Since, in this modern world, relationships change at a rapid pace or they tend to be more situational, many mobile subscribers wish to have real-time control over a caller's access to their contact information and provide it to a requesting party on a case-by-case basis. The second reason the user may wish to restrict this information is that often the user is required to pay for all calls made to or from their mobile phone. The user may not wish to pay to talk with certain types of callers or the mobile subscriber may desire to screen who has access to their contact information.

Typically the method used in landline communications networks to restrict access to directory assistance information has been to allow the user to have an unlisted number. This allows for an opt-out method for the users to restrict their contact information. Another method that has been suggested for disseminating mobile subscriber's contact information is a method where the mobile subscriber can opt-in to a directory or add their number to the directory assistance listing. The problem with both of these methods is that they treat all callers who are requesting directory information with the same level of importance. For instance a mobile subscriber may wish to opt-out (or not opt-in) to a directory in order to limit access by telemarketers; however, the mobile subscriber would like their babysitter to be able get their number from directly assistance in the event of an emergency. There have been numerous efforts to get an opt-in or opt-out mobile phone directory into the market, but these efforts have met with little success in the United States.

What is required is a method and apparatus that allows a mobile subscriber to control the access to their contact information in real-time or near real-time. This method and apparatus should be able to distinguish between different calling parties and should be able to restrict, limit, or allow access to the contact information, location, address, or other personal information associated with the mobile subscriber on an instance-by-instance basis. What is also needed is a method and apparatus that allows a mobile subscriber to provide a delayed or non-real-time grant of permission to release their information and to have that information routed to the person or device requesting the information.

SUMMARY OF THE INVENTION

In view of the forgoing, the present invention addresses the needs of the prior art by providing a novel solution for offering information services. For one aspect of the invention, a query is received, typically by an information system, based on a request from a requesting party for information about a mobile subscriber of a mobile telephone network. The requested information typically comprises information relevant to the mobile subscriber, such as at least one of location information, telephone number, address, or other information specific to the mobile subscriber.

Responsive to the query, the information system, alternatively described as an MDMS server, issues a permission release request to a mobile communication device associated with the mobile subscriber. The permission release request seeks permission for release of the requested information on behalf of the requesting party. The permission release request typically comprises an identity of the requesting party and/or a telephone number for the requesting party. The contact information for the requesting party can be stored by the information system in response to passage of a time period without receipt of an initial response to the permission release request for release of the requested information.

The requested information can be released by the information system for distribution to the requesting party in response to a delayed receipt of a permission release response output by the mobile communication device after passage of the first time period. In the alternative, the requested information can be released for distribution to the requesting party in response to a delayed receipt of the permission release response, after passage of the first time period and subsequent to the expiration of a second time period. This permission release response provides permission for communication of the requested information to the requesting party. The information system can direct a communication for the requesting party based on the stored contact information for that party.

The permission release request can be presented to the mobile subscriber as content for a first display screen of a user interface for the mobile communication device prior to passage of the time period. In addition, the permission release request can be presented to the mobile subscriber as content for a second display screen of the user interface after the passage of the time period. The content of the first display screen is typically different from the content of the second display screen. For example, the content of the second display screen, presented later in time than the first display screen, can present dynamically updated information to the mobile subscriber.

The mobile communications device can include logic that processes the permission release request in support of an automated decision to output the permission release response. In the alternative, the mobile communications device can output the permission release response in response to a decision made by the mobile subscriber based on interactions with a user interface of the mobile communication device. In particular, the mobile communication device can output the permission release response in response to a decision made by the mobile subscriber as a result of a presentation by a user interface of the mobile communication device, the presentation providing an identity of the requesting party.

The requested information can be distributed to the requesting party in the form comprising: a text message transmitted to the a mobile communication device of the requesting party; an integrated voice response device (IVR) speaking the requested information to the requesting party, an operator calling the requesting party with the requested information; a web page presenting the requested information; a video message transmitted to the mobile communications device of the requesting party; a multimedia message transmitted to the mobile communications device of the requesting party; or an electronic mail message presenting the requested information.

For another aspect of the invention, a request can be received from a requesting party for information about a mobile subscriber of a mobile telephone network. In response to the request, a communication is provided to a mobile communication device associated with the mobile subscriber to seek permission for release of the requested information on behalf of the requesting party. Contact information for the requesting party is typically stored in response to a delay in receiving a communication confirming permission for release of the requested information. This contact information defines an identifying characteristic for a communication device accessible by the requesting party. The requested information is communicated to the requesting party's communication device in response to the delayed receipt of the permission release response. For example, the requested information can be communicated to the communication device only after an expiration of a predetermined time period that is initiated by the mobile communication device's receipt of the communication seeking permission for release of the requested information. The communication of requested information can be completed after this passage of time from the receipt of the permission release request based on access to the stored contact information.

The contact information for the requesting party is obtained by using the telephone number assigned to the communication device of the requesting party. The type of the communication device used by the requesting party to issue the request for information can be used to assist an identification of a preferred mechanism for communicating the requested information to the requesting party's communication device. The type of the network serving the requesting party can be used to assist an identification of a preferred mechanism for communicating the requested information to the requesting party's communication device.

For yet another aspect of the invention, a method is provided for controlling a release of information on behalf of a mobile subscriber of a mobile telephone network. The subscriber's mobile communication device can receive a permission release request issued by an information system that is independent of the mobile telephone network. The permission release request seeks permission for release of information about the mobile subscriber to a requesting party. A user interface of the mobile communication device presents a first display screen comprising at least a portion of the permission release request. In turn, the user interface can present a second display screen after expiration of a time period and in the absence of a decision of whether to release the requested information. This second display screen typically presents identifying information about the requesting party. In response to the second display screen, the mobile subscriber can decide to release the requested information based on the identifying information about the requesting party. Based on this decision, the mobile communication device can output a permission release response for distribution to the requesting party. The permission release response provides permission for communication of the requested information for use by the requesting party.

The second display screen typically presents at least one option for contacting the requesting party via a voice communications channel initiated by the mobile communications device. In the alternative, the second display screen can present at least one option that automatically contacts the requesting party via a voice communications path initiated by the mobile communications device in advance of communication of the requested information. Or, the second display screen can present information instructing the mobile subscriber on options for contacting the requesting party prior to any release of requested information to the requesting party. An option is typically implemented by the user interface as a selectable control, button, check box, menu item, dialog box item, a selectable link, graphical item, icon or text item.

Additional aspects, features and advantages of the invention will become apparent to those skilled in the art upon consideration of the following detailed description of illustrated embodiments exemplifying the best mode of carrying out the invention as presently perceived.

DETAILED DESCRIPTION OF EXEMPLARY EMBODIMENTS

Figure 1A:
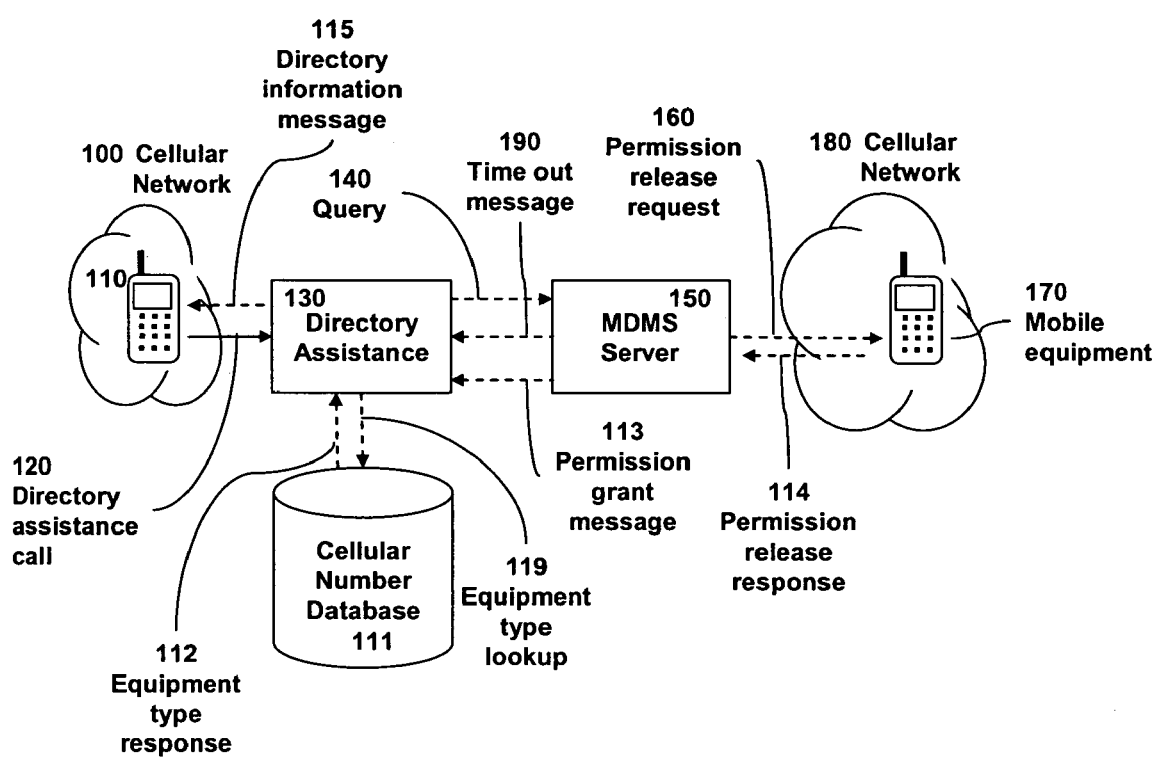
FIG. 1A is an illustration of an information system constructed in accordance with an exemplary embodiment of the present invention.

The present invention answers the deficiencies in the prior art by allowing a mobile subscriber user to allow, restrict, or deny access to their personal information or to alternatively contact the requesting party directly. The invention uses the mobile network to provide a request for information release to a mobile subscriber. The invention also allows the release of the information to the party originally contacting the directory assistance service (requesting party) after the permission is granted by the mobile subscriber.

An exemplary Mobile Directory Messaging System (MDMS), otherwise described as an information system, allows for a call into a directory assistance facility to be screened to determine if the request was for a landline, mobile, or other type of number. The user query is handled as a normal query if the request is for a landline number; however, if it is determined the caller is attempting to ascertain the number for a mobile subscriber, the MDMS server would use the logic disclosed herein to respond to the request. For example, if the directory assistance platform determines that the requesting party is seeking a mobile number, the MDMS formats a short data message, typically a text message, for transmission to the mobile subscriber's communication device to request the mobile subscriber's permission to release the requested information to the requesting party. The request can contain information, such as, the requesting party's name, requesting party's phone number, type of request, location information, telephone number request, address request, or any other information specific to the mobile subscriber—hereafter referred to as directory information. The mobile subscriber can respond to the request issued by the MDMS server by granting, limiting, or denying the requesting party access to the requested information, namely the directory information Based on messaging from the MDMS server, the directory assistance system (or operator) can provide the directory information to the requesting party if permission is granted by the mobile subscriber. Alternatively, if the MDMS server determines that permission is withheld by the mobile subscriber or if the mobile subscriber failed to respond to the request, the directory assistance system responds to the MDMS message by transmitting a message to the requesting party to indicate that the directory information is not available. If desirable by the network operator, the requesting party can be charged according to the availability of the directory information for release.

If however, the mobile subscriber has delayed a grant of permission to release their directory information, the requesting party's contact information can be gathered and stored. When and if the permission grant is eventually received from the mobile subscriber, an exemplary embodiment of the MDMS can be programmed to automatically send the mobile subscriber's directory information to the requesting party. This allows the requesting party to receive the requested information, typically directory information, even if the mobile subscriber's permission grant was delayed by an extended period. For example, the mobile subscriber's device may be turned off or the mobile subscriber declines to promptly respond to the message. The transmission of requested information to the requesting party can take the form of a short message, such as a text message, sent to the requesting party's mobile device, an integrated voice response device (IVR) speaking the directory information to the requesting party or a voice mail, a live operator calling with the directory information, a web page with the relevant directory information, a simple e-mail with the contact directory information, a multimedia message, a video message, or any other appropriate delivery mechanism (hereafter referred to as "Delivery").

An exemplary MDMS can be programmed to store the mobile subscriber directory information in the event the requesting party can not be immediately contacted. This allows the requesting party to receive the directory information even if the mobile subscriber is not presently available to promptly respond to the directory information request. The directory information can be stored indefinitely until the MDMS server determines the mobile equipment is available or alternatively the directory information can be made available based on rules defined by the directory assistance provider, mobile operator, MDMS provider, or other interested party.

In order to facilitate the delayed delivery of the mobile subscriber directory information to the requesting party, an exemplary MDMS can be programmed to capture the identification of the calling number, query a database, and perform an analysis to determine what type of device the requesting party is using to contact the MDMS. The database queried can range from a listing of mobile numbers accessible by the MDMS server, analyzing the calling number to determine if it falls into a range of known mobile numbers, querying an external database such as the mobile number portability database, some combination of these methods, or similar methods to determine the type of device used by the requesting party. If the directory assistance system determines the requesting party is using a known mobile device the MDMS server can be programmed to offer delivery of the mobile subscriber's directory information in the event of a delayed permission grant. The MDMS can also be programmed to determine if the requesting party's network is a partner network and use this information in the analysis of how to provide Delivery of the directory information to the requesting party in the event of delayed permission.

If the permission grant is not received in real-time from the mobile subscriber, it may be desirable to change the look and feel of the display or information provided to the mobile subscriber. An example of how the messages may change over time is as follows:

The initial message to the mobile subscriber can consist of text similar to (also illustrated in FIG. 4):

---
From Cingular - John Smith at
404-843-0431 is requesting your
directory information. May we release it?
Yes            No
---

If a predetermined period of time elapsed and the mobile subscriber did not respond to the initial message or the MDMS server sent a continuation message (e.g., the requesting party had terminated the call), the display would be changed. The second display message would be (also illustrated in FIG. 5):

---
From Cingular - John Smith at
404-843-0431 requested your
directory information at 2:30 on
Tuesday September 22$^{nd}$ 2005.
You can call him back or alternatively
we can provide him your directory
information directly.
I will call            Please release my information
---

If the mobile subscriber selected the "No" option on the first screen or the "I will call" option on the second screen, a display similar to the following could then be presented:

---
You can call John Smith
at 404-843-0431
while blocking your calling
identification. To do this you must
dial *67 before the telephone
number. Would you like to call now?
Yes        Yes and block my number        No
---

This string of messages will be dynamic and programmed to change dependant on time and/or user feedback. The message type and extent of the message displayed could also be dependant on the type of mobile device that is being used by the mobile subscriber. For example if the mobile device has the capability to process applications, such as Java or Brew, then the displays could allow for many more choices and could provide more information dependant on elapsed time and/or mobile subscriber input. If however, the mobile device only provided short messaging the message could be formatted to best fit this type of delivery. Also, if the mobile device did not have any signaling capabilities the MDMS could be programmed to deliver the message via a voice channel utilizing an IVR, an operator, or some combination of these methods.

The different portions of the message can be variable and provided to the application on the mobile equipment in the trigger or subsequent message(s). For example, the name of the mobile network operator can be dynamic and defined by the trigger message. This would allow the mobile operator to change their name or corporate identity/image or to provide this type of service to a mobile virtual network operator (MVNO) without altering the basic software for the application on the mobile equipment. Other examples of fields on the user screens that may be desirable to make dynamic in nature are requesting party's name, requesting party's contact number, date of request, time of request, call block codes, textual information regarding current features available, options available to the mobile subscriber, or other similar fields. It should also be understood that this type information can alternatively be stored on the mobile device, default information can be stored on the mobile device, or the mobile device may be able to ascertain this information independently; e.g., date and time of the request from the clock on the mobile.

It is also possible for the mobile subscriber to set up the application on the mobile equipment to automatically respond any future messages of a similar type. The mobile subscriber can configure their mobile equipment to automatically accept or alternatively automatically reject all permission requests from the MDMS. Also it is possible for the mobile subscriber to configure their mobile equipment to always accept or reject a request from a certain requesting party or a certain class of requesting parties such as all international requests, all requests from unidentified parties, or all requests from parties not stored in the phonebook on the mobile equipment. If a request is automatically accepted or rejected the mobile equipment can be alternatively configured to provide the mobile subscriber with an alert message stating the request has been automatically handled or the mobile equipment can be configured to hide these alerts from the mobile subscriber. If the mobile equipment was configured to display the automatic handling information the mobile subscriber could then be provided with the option to connect with the requesting party directly as described in this disclosure.

In order to determine what type of messaging should be sent to the mobile device, an exemplary MDMS server can be programmed to determine the type of mobile device prior to sending any messaging to the mobile subscriber. This information can either be programmed into the MDMS server or the MDMS server can query a database for the relevant information prior to determining how to format and transmit the message to the mobile subscriber. This allows a MDMS to tailor the delivery of the information to match the features and functionality available on the mobile device.

It may also desirable to determine if the requesting party's information is available and if the requesting party is calling from a number that has been screened by a trusted partner. The information indicating that the call has been screened by a trusted party may be obtained from the call set up message received from the network when the requesting party calls the directory assistance service center. Since most of these calls will be received from users that are subscribers when they dial a predetermined code, such as 411, on the network offering the directory assistance service, the requesting party identity should be known to the directory assistance center serving that network and can be verified, and used to validate the identification of the requesting party or their equipment. However, if the requesting party's information is not available, not screened by a trusted party, the requesting party does not wish to offer their calling information (e.g., unlisted number, or has marked their number as private and not to be released when placing a call), the directory assistance service can provide the option to the requesting party to present or validate their personal contact information for use when requesting release of the mobile subscriber's directory information The requesting party can release restrictions on use of their identity, validate their identity with the network or directory assistance provider, or continue to restrict the information. If the requesting party releases the information the MDMS server can forward this information on to the subscriber application and the application can present the information to the user with the calling name, phone number, and other data that may be used to identify the requesting party.

If however, the requesting party indicates their preference to restrict the dissemination of their contact information or maintain the privacy of their information, the directory assistance provider, MDMS server, or other device in the network can choose to not allow the message to the mobile subscriber or to request the permission to release the contact information. Alternatively the MDMS server can alter the message to the MDMS application to indicate that the call is from an unscreened or unavailable number. The subscriber application could then be altered to indicate that the message was received from a non-screened number or from a requesting party that chose to keep their identity from the mobile subscriber. This can be done by altering all or part of the user screens, presenting new user screens, altering the sequence of the user screens, offering new user selections, altering existing user selections, any combination of these methods, or other methods that will be obvious to those skilled in the art when taking into account this disclosure.

It may also be desirable to determine the current location, country, or network serving the mobile subscriber whose directory information is being requested and then determine the appropriate code or method to hide or block the calling information associated with the mobile equipment or mobile subscriber. In the United States the code to restrict the transmission of the calling line identity to the calling party is often "*67" dialed before the telephone number; however, it may be different in other countries or networks. This code or method can be transmitted to the application on the phone so it may be displayed to the mobile subscriber or alternatively used in the application on the mobile phone when placing an outbound communications attempt directly from the application on the mobile equipment. This will enable the mobile subscriber to initiate a communications path directly to the requesting party without divulging their identity or contact information. The code to block or hide the identity of the mobile equipment's or mobile subscriber's identity may change depending on the current serving network. It also might not be possible or necessary to block the identity of the mobile equipment or mobile subscriber. If this were the case the subscriber application could be programmed not to offer this option or alternatively to alert the mobile subscriber to this restriction or modification in the operation of the application.

One potential problem in providing the application on the phone with the code to block the identity of the mobile equipment or mobile subscriber is that the mobile equipment may change networks, locations, or countries before the mobile subscriber views the message or attempts to communicate directly with the requesting party. It is possible for the mobile equipment to move into another network where the identity block or code originally provided to the application does not work as expected, may not be valid, or may cause an error in providing the service. In this instance it is desirable for the subscriber application to monitor the network serving the mobile equipment when it receives the identity block code and to determine if the mobile equipment has entered a subsequent network where the current code or method may not be valid. If this occurs the subscriber application can be programmed in such a manner as to not offer the option of blocking the identity, inform the mobile subscriber that blocking the identify is not an option, remove the menu choice that allows the mobile subscriber to directly contact the requesting party, or other similar methods that will become obvious to those skilled in the art when taking into account this disclosure.

Once the application on the mobile equipment had the information as to the contact number and possibly the name of the requesting party, it would be helpful if the application on the mobile equipment would allow the mobile subscriber the option to automatically edit and store this information into their existing personal phonebook, mobile equipment phonebook, or subscriber identity module phonebook. The preferred method to accomplish this would be for the application on the mobile equipment to be programmed to offer this option to the subscriber if a message contained at least the contact number of the requesting party. The application on the mobile equipment should provide the mobile subscriber with the opportunity to edit the information prior to storing it into the phonebook to allow the mobile subscriber to add any missing information, change the format of the phonebook name to better fit their current phonebook format, to change the name of the requesting party to be more recognizable, or to allow the entry to be saved with a name that is easier for the mobile subscriber to find at a later date (e.g., allow the entry to be saved under nicknames or as a relationship to the mobile subscriber).

If the mobile number is unscreened by the network the application on the mobile equipment can be programmed to not allow the mobile subscriber to automatically contact the requesting party directly; however, it may still be desirable to allow the mobile subscriber to automatically store the requesting party's contact information into their personal phonebook. This would allow the mobile subscriber to contact the requesting party outside of the MDMS application on the mobile phone.

It is also possible for the number used by the application on the mobile equipment to contact the requesting to be different from the direct contact number of the requesting party. An example of this is if the directory assistance provider desires to allow the mobile subscriber the option to automatically connect to requesting party via a voice channel while the requesting party is holding on the directory information system and waiting for the requested information. If this were the case, it may be desirable to route the communications from the mobile subscriber through a communications system connected to the directory assistance platform where the requesting party is currently holding. This would allow the mobile subscriber to automatically contact the requesting party while they were holding for the directory information This functionality could also be provisioned to automatically block the mobile subscriber's phone number or other identifiable information.

If it were desirable to allow the voice connection while the requesting party was holding the message to the mobile application would need to include the direct contact number for the requesting party so this number could be stored in the phonebook. The message to the mobile application would also need to include a second routing number that could be used to contact a meet me type platform where the requesting party was holding. The meet me conferencing system will allow the two inbound communications paths to be joined. This would allow the mobile equipment to originate a call back to the conference port where the requesting party's call was currently parked or monitoring. When the call from the mobile equipment arrived the meet me conferencing system would then recognize the incoming communications and would bridge the requesting party's and mobile subscriber's voice communications paths together. This would allow these parties to communicate without divulging any of the mobile subscriber's directory information to the requesting party. A third option of making this connection. The direct connect functionality should be provisioned on the user screens when attempting to gain permission for the release of the requested directory information from the mobile subscriber in real time; however, it may not be desirable to allow this functionality when requesting a delayed grant of permission.

Yet another exemplary method of providing the direct voice connection is to allow a message from the mobile subscriber to the MDMS server indicating that a voice communications path was approved. This would trigger an outbound call from the directory information system serving the requesting party to the mobile subscriber. The major problem with this method is that the requesting party may then see the mobile subscriber's directory information when they received their bill for this call. In order to hide the mobile subscriber's directory information the directory information system serving the requesting party would be instructed to suppress the mobile subscriber's directory information One method of performing this would be for the directory information system placing the call to the mobile subscriber to prefix a dialing code to the mobile subscriber's contact number. This prefix would cause the call to be routed over special trunks that caused the called number contact information to be suppressed.

Turning now to the drawing set, FIG. 1A is an illustration of an exemplary system having a network and communications path between a requesting party 110 through the directory assistance platform 130 and out to the mobile subscriber 170 with a return path to the requesting party 110. The session initiates with a call 120 from the requesting party 110 to the directory assistance platform 130. Once the call 120 arrived the directory assistance platform 130 would screen the call 120 to determine if it was destined for a mobile subscriber or mobile equipment. If it was determined the call was destined for a mobile subscriber or mobile equipment, the platform would send a message 140 to the MDMS server 150 requesting permission to release the mobile directory information A request message 160 would then be sent to the mobile subscriber 170 in the mobile network 180. In the case illustrated in FIG. 1A if the mobile subscriber does not immediately respond to the permission request message, it would cause a time out in the MDMS server 150 and would trigger a time out message 190 to the directory assistance platform 130. The directory assistance platform 130 would then determine if the original calling party 110 requesting the directory information was using a device that could receive a text message or other multimedia protocol. The preferred method to determine how to provide the directory information to the calling party 110 is to look up the device in a database 111 of known devices and then determine the method for providing the directory information to the calling party 110. It is even possible to perform a look up to determine the type of device and the extent of the service provisioned on the device (not shown). This functionality could be performed on the initial look up or on a subsequent look up in a second database (not shown). The equipment look up 119 into database 111 would trigger an equipment type response 112 that would provide an indication if the calling party 110 was appropriately equipped to receive a delayed transmission of the requested directory information This same functionality can also be achieved by determining the directory system that sent the request, facility on which the request is received, address of the directory assistance request, or other similar means that will be known to those skilled in the art. If the directory assistance system 130 determined that device 110 was served by a network that was capable of receiving a messaging protocol 100 and the device 110 was so equipped, the directory assistance platform 130 would then offer the option of providing a delayed message containing the directory information for device 170 and the directory information for the device 110 would be associated with the outstanding message to the device 170.

If the mobile subscriber 170 responded to the query to release the directory information 114 or the mobile equipment was programmed to automatically respond to the message, the MDMS server 150 would receive the message 114 and would then determine the mobile subscriber directory information and transmit a permission grant message 113 to the directory assistance platform 130. The message 113 typically contains the mobile subscriber directory information maintained by the MDMS server 150 for the mobile subscriber 170. The receipt by the directory assistance platform 130 of the message 113 would trigger the transmission of a message 115 with the directory information to the requesting party 110. While the exemplary method can send this message as a text message sent via short message service, the message can be implemented by multimedia, voice, video, or other similar form of conveying the information to the requesting party 110.

One skilled in the art, using this disclosure, can see how the delayed permission to release mobile subscriber's directory information method described above can be modified to combine functionality into one platform or further split out among multiple different components and databases. One skilled in the art, using this disclosure, can also see how it is possible to provide the same functionality by placing the messaging means to contact the requesting party 110 directly into the mobile subscriber's device 170. This would allow the mobile subscriber 170 to message the requesting party 110 at their leisure and perhaps even include additional user defined information (not shown).

Figure 1B:
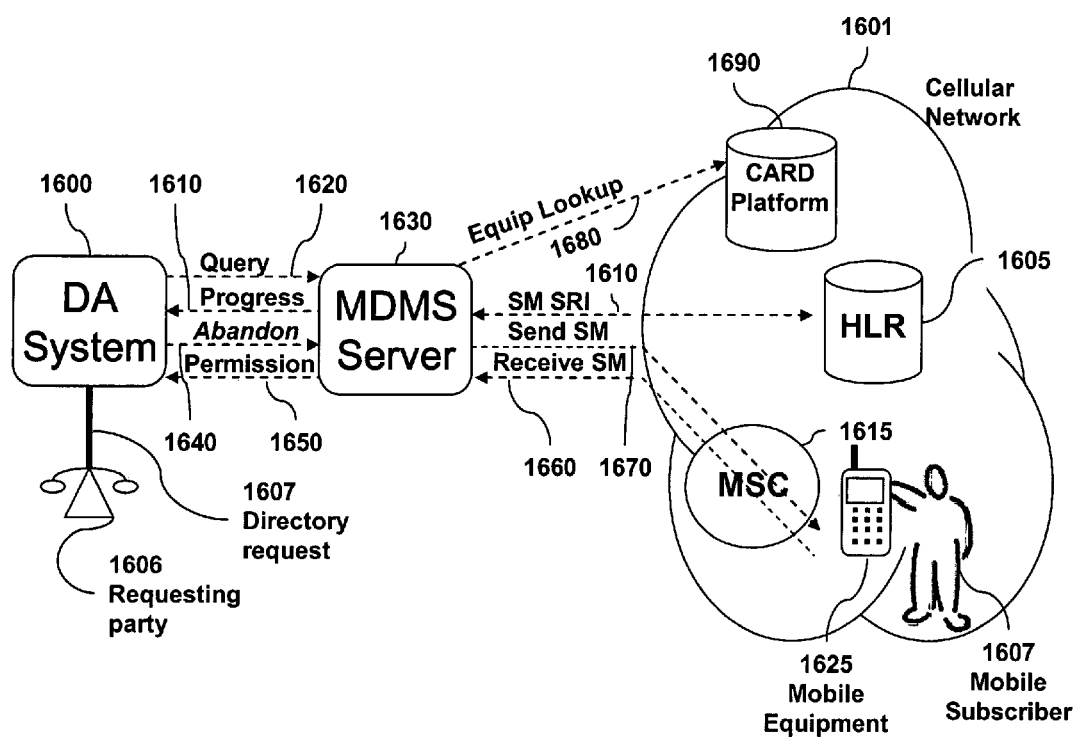
FIG. 1B is an illustration of an information system that responds to receipt of a directory assistance query by issuing a request for permission to release information about a mobile subscriber, in accordance with an exemplary embodiment of the present invention.

FIG. 1B is a detailed illustration of a representative operating environment for an information system operative to receive a directory assistance query from one of a number of directory assistance providers. Once the directory assistance provider 1600 determined the request for information required permission from the mobile subscriber 1607, it would send a query message 1620 to the MDMS server 1630. This query 1620 would cause the MDMS server 1630 to send out a message to the customer database (shown as a home location register—HLR 1605) of the mobile network 1601. This query is designed to provide a routing number for the mobile equipment 1625, the current status of the mobile account, as well as to determine certain features and functionality of the mobile equipment 1625. At approximately the same time, the query would trigger an equipment lookup 1680 to be sent to an equipment functionality database (shown as the CARD platform; however, this platform is typically not defined by the standards in the industry and may be incorporated into other network elements or called by another name) 1690 in the home mobile network 1601. This step may not be required in some networks that have a more homogeneous distribution of mobile phones with the enhanced functionality needed to display text and menus. Example of these types of network and functionality are GSM with JAVA deployed on a majority of the SIM cards and CDMA networks with BREW functionality deployed on the handsets. The equipment lookup 1680 is designed to provide the functionality of the mobile equipment 1625 so that the MDMS server 1630 can make a determination of the most appropriate method of formatting a message to the specific mobile equipment 1625. Once the MDMS server 1630 knows the location of the mobile equipment 1625 and the most appropriate method to send a data message 1670 to the mobile equipment 1625, it can format the message 1670 and send it to the mobile equipment 1625. In this exemplary illustration the message 1670 is shown as a short message on a GSM network 1601; however, one skilled in the art, using this disclosure, can easily determine how this message 1670 may be transported on a multitude of different data or voice communications paths to the mobile equipment 1625 or can be transported across almost any type of wireless network. In this exemplary illustration the message 1670 is transported through a mobile switching system (show as the MSC) 1625. Once the mobile equipment 1625 receives the permission message 1670 and the mobile subscriber 1607 or mobile equipment 1625 indicated their preference (note—the mobile equipment 1625 may be optionally set to automatically respond to the permission message with a preconfigured response), the mobile equipment 1625 would then send a message 1660 back to the MDMS server 1630 indicating their granting/withholding of the mobile subscriber's permission. The MDMS server 1630 would then format and transmit the appropriate permission message 1650 to the directory assistance provider 1600 originally generating the query 1620. If however, the originally requesting party hangs up before the permission message 1650 is received, the directory assistance provider 1600 would send an abandon message 1640 indicating that the originally requesting party has abandoned their initial request. The MDMS 1630 would then handle the session as appropriate. If the original query message 1620 indicated that the requesting party had delayed permission grant the MDMS server 1630 would forward the delayed permission grant to the directory assistance provider 1600 when and if it was received from the mobile equipment 1625.

Figure 2:
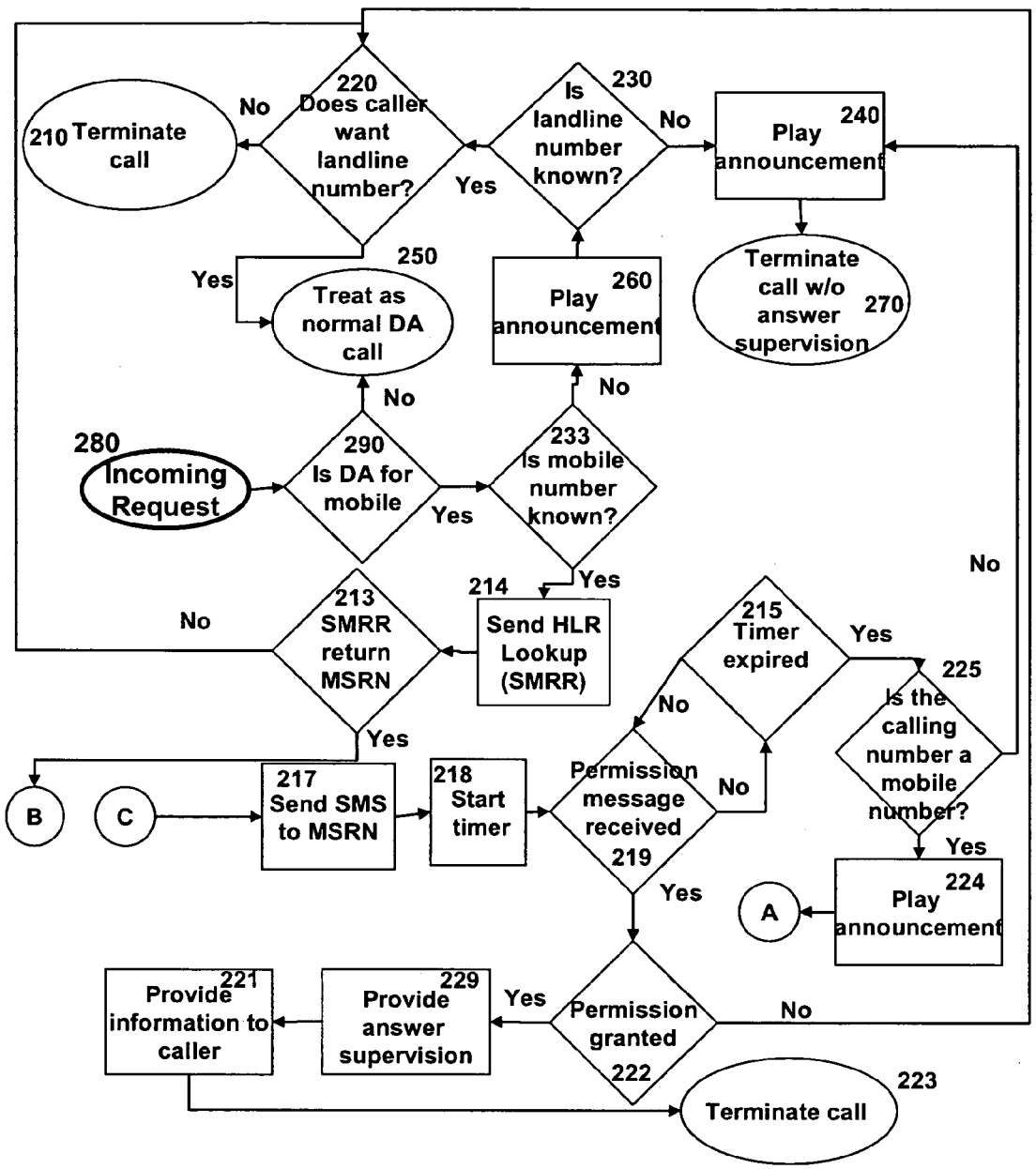
FIG. 2 is a flow chart detailing a decision process for determining call handling in an exemplary embodiment of the system.
Figure 3:
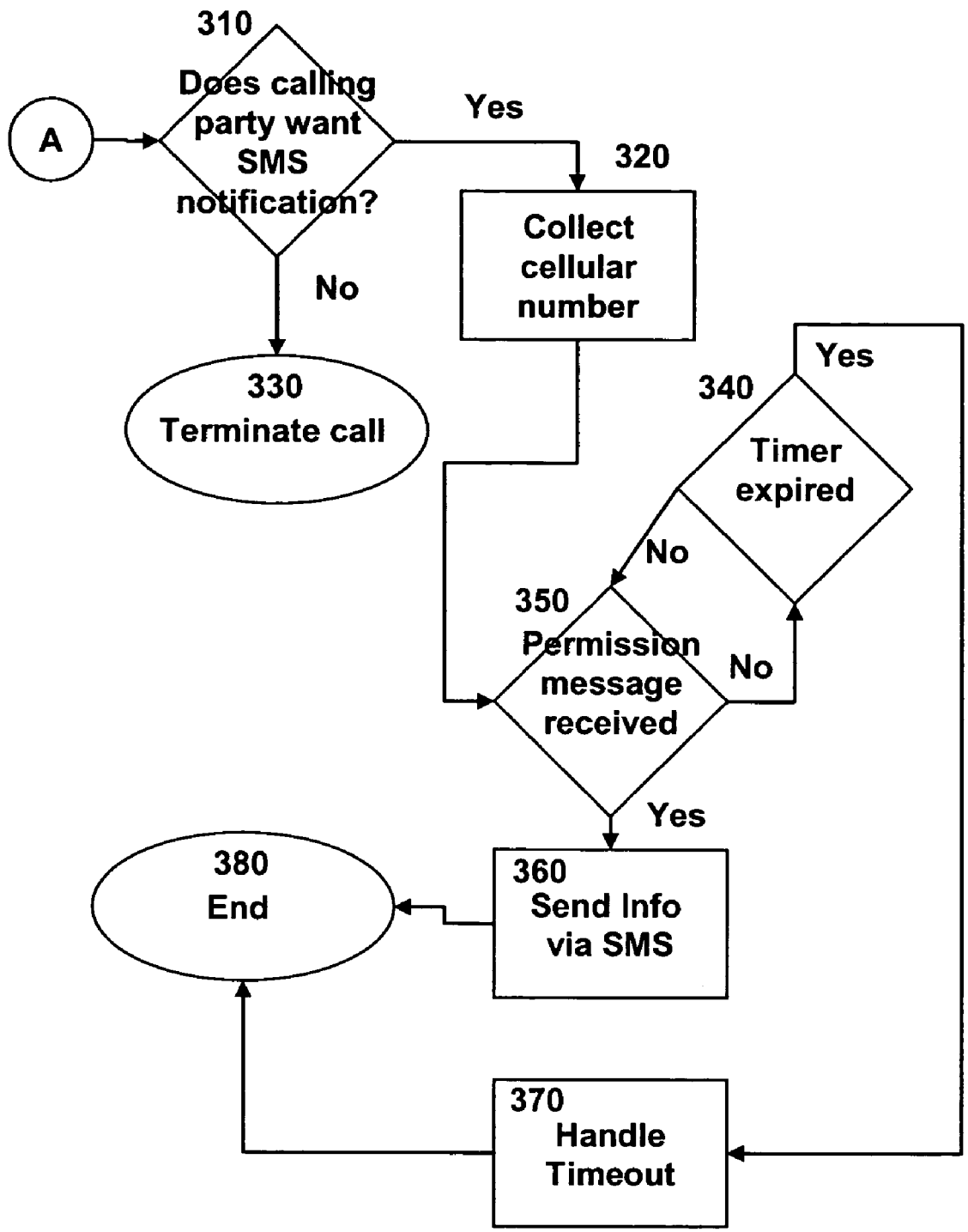
FIG. 3 is a flow chart detailing a decision process for determining call handling in an exemplary embodiment of the system.

FIGS. 2 and 3 are flow charts illustrating an exemplary method useful for determining how to handle the query requesting the directory information from the mobile subscriber and illustrating the an exemplary method of delayed granting of permission to release the mobile subscriber's directory information Turning now to FIGS. 1A, 1B, 2 and 3, the exemplary process begins when the requesting party 1606 issues an incoming request for information, typically a directory information request, in step 280. In response to the incoming request, a directory assistance platform 1600 conducts an inquiry in step 290 to determine whether the incoming request is destined for a mobile user, such as the mobile subscriber 1607. If the response to this query is negative, the directory assistance platform 1600 treats the incoming request as a normal directory assistance request in step 250. If the incoming request is destined for a mobile user, however, the MDMS server 1630 conducts an inquiry in step 233 to determine if the cell number for the mobile user is known. If the mobile address is known the MDMS server 1630 then send a customer database request 1610 in step 214 to the mobile network's 1601 customer database 1605 (FIG. 1B represents this database as an home location register or HLR). If the mobile equipment 1625 number is not known, then the directory assistance platform 1600 plays an announcement in step 260 to indicate that the mobile number for the mobile user 170 is not available. In addition, the directory assistance platform 1600 determines, in step 230, if an alternate number is known. If so, the directory assistance platform 1600 conducts an inquiry in step 220 to determine whether the requesting party 1606 wants the alternate number. If the requesting party 1606 wants the alternate number, the directory assistance platform 1600 processes the call as a normal directory assistance call in step 250. If the requesting party 1606 does not want the alternate number, the directory assistance platform 1600 terminates the call in step 210. If the call is terminated, the directory assistance system operator can choose not to provide answer supervision back to the telephone network so the calling party does not pay for the failed directory assistance attempt.

Picking up the exemplary sequence just after the customer data base query, step 214, the MDMS server 1630 then would receive a response to the message 1610 from the customer database 1650 indicating what is known about the mobile subscriber 1607 and the mobile equipment 1625. If the location of the mobile equipment 1625 was not known or it was not currently attached to a network, the directory assistance system 1600 would then play announcement in step 260 indicating that the mobile subscriber 1607 is not available, determine if the alternate number is known, step 230, and if the requesting party 1606 desires to obtain the alternate number, step 220. If the requesting party 1606 wants the alternate number the call is handled as a normal directory assistance call, step 250. If the requesting party 1606 does not want the alternate number the call is terminated in step 210. If the call is terminated the directory assistance system operator can optionally choose not to provide answer supervision back to the telephone network so the requesting party 1606 does not pay for the failed directory assistance attempt.

Figure 8:
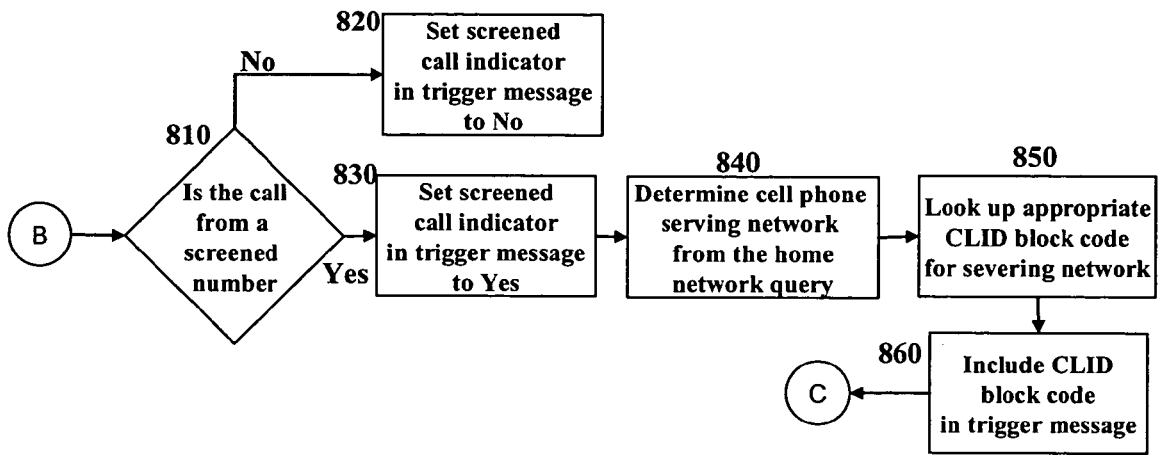
FIG. 8 is an illustration presenting a process for formatting a trigger message to indicate if the telephone number of a requesting party has been screened to ensure presentation of the requesting party's identity, in accordance with an exemplary embodiment of the present invention.

Picking up the sequence just after the mobile system customer database query return 1610, step 213, the MDMS server 1630 would then execute logic for determining and handling a call from a screened or unscreened caller (logic flow begins at point B and returns at point C, the exemplary logic sequence is illustrated in FIG. 8 and discussed later in this disclosure) then would send out a data message to the last known location of the mobile equipment 1625 as shown in step 217. The MDMS server 1630 would then start a timer in step 218 to ensure the message return from the mobile equipment 1625 was within the acceptable wait time for the requesting party 1606. The MDMS server 1630 would then go into a loop of checking to see if the timer has expired, step 215, and checking to see if a permission message was received, step 219, from the mobile equipment 1625. If the timer expires before the message is received, the MDMS server 1630 would then determine if the requesting party 1606 was calling from a device that was capable of receiving a delayed message, step 225. If the requesting party was calling from a device 1606 that could receive a delayed response, the directory assistance system 1600 would then play an announcement, step 224, and query the requesting party 1606 if they desire to receive a delayed message (point A refers to a continuation of the logic sequence in FIG. 3) provided the mobile subscriber 1607 provides permission releasing the directory information, step 310. If the requesting party did not desire delayed notification the communications session 1607 would be terminated; however, if the requesting party 1606 chose to be notified in the event of a delayed permission grant, the directory assistance system 1600 would collect and store the requesting party's 1606 contact information, shown in step 320, and begin monitoring to determine if the permission had been received from the mobile subscriber 1607, step 350. The MDMS server 1630 would also start a second timer, step 340, to determine if the MDMS server 130, should abandon the attempt to contact the mobile subscriber, step 370, and end the process, step 380. If however, the delayed permission 1660 is received from the mobile subscriber 1607, the MDMS server 1630 would send a message 1650 to the directory assistance system 1600 and the directory assistance system 1600 would then send a message to the requesting party 1606 with the directory information, step 360, and end the process, step 380.

Looking now to step 219, if the message 1660 from the mobile subscriber 1607 was received before the timer expired, the MDMS server 1630 would then determine if the mobile user 1625 had granted their permission, step 222. If the user denies permission, the MDMS server 1630 and directory assistance system 1600 handles the request 1607 as described above starting at step 230. If the mobile user granted their permission, then the directory assistance system 1600 would give answer supervision, step 229, to ensure the requesting party 1606 was billed and then provide the mobile number to the requesting party 1606. The session would then be terminated, step 223.

Figure 4:
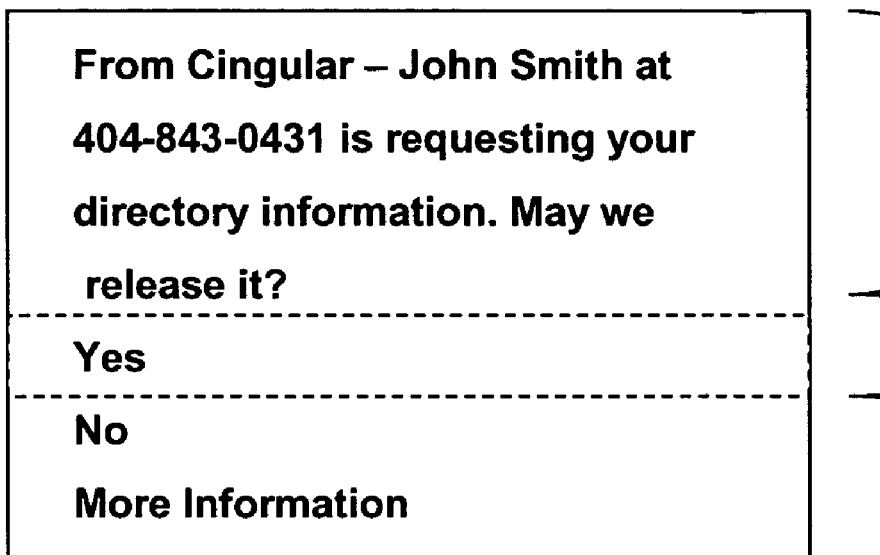
FIG. 4 is an illustration of an exemplary example of an initial screen provided to a mobile subscriber requesting permission to release their directory information.

FIG. 4 is an illustration of an exemplary screen that can be provided by the application on the mobile equipment 1625 to the mobile subscriber requesting the release of the directory information The screen in FIG. 4 is broken up into several sections. Section 410 consists of a statement and or a question from the mobile subscriber's network operator 1601 asking for the real-time permission to release the directory information to the requesting party 1606. This section can contain information such as the requesting party's 1606 name, requesting party's 1606 contact information, the mobile network operator's 1601 identification, an explanation of the request, and even possibly a statement indicating that the mobile subscriber 1607 will not be billed for this call. Section 420 is the default selection and in this example is the permission grant to release the directory information to the requesting party 1606. Section 430 comprises other selections that can be chosen by the mobile subscriber 1607. In this example, these selections consist of a method to decline to release the directory information to the requesting party 1606 and a selection that provides more information.

Figure 5:
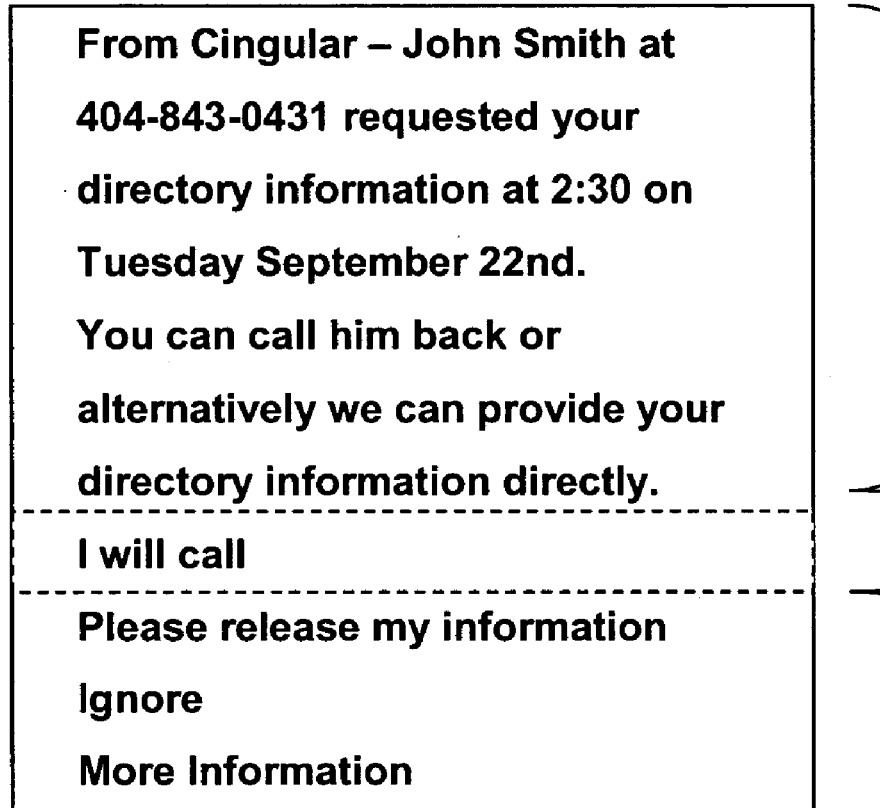
FIG. 5 is an illustration of an exemplary example of a time out screen provided to a mobile subscriber requesting permission to release their directory information.

FIG. 5 is an illustration of an exemplary screen that would be displayed in place of the screen shown in FIG. 4 in the event of encountering a time out as contemplated in 215. The screen in FIG. 5 is broken up into several sections. Section 510 consists of a statement and or a question from the mobile subscriber's network operator 1601 asking for the delayed permission to release the directory information to the requesting party 1606. This section can contain information such as the requesting party's 1606 name, requesting party's 1606 contact information, time of the original request, the mobile network operator's 1601 identification, an explanation of the request, and even possibly a statement indicating that the mobile subscriber 1607 will not be billed for this call. Section 520 is the default selection and in this example is an indication that the mobile subscriber 1607 can call the requesting party 1606 back directly. Section 530 comprises other selections that can be chosen by the mobile subscriber 1607. In this example, these selections consist of a method to grant the delayed release the directory information to the requesting party 1606, a selection that allows the mobile subscriber 1607 to ignore the message, and a selection that provides more information.

Figure 6:
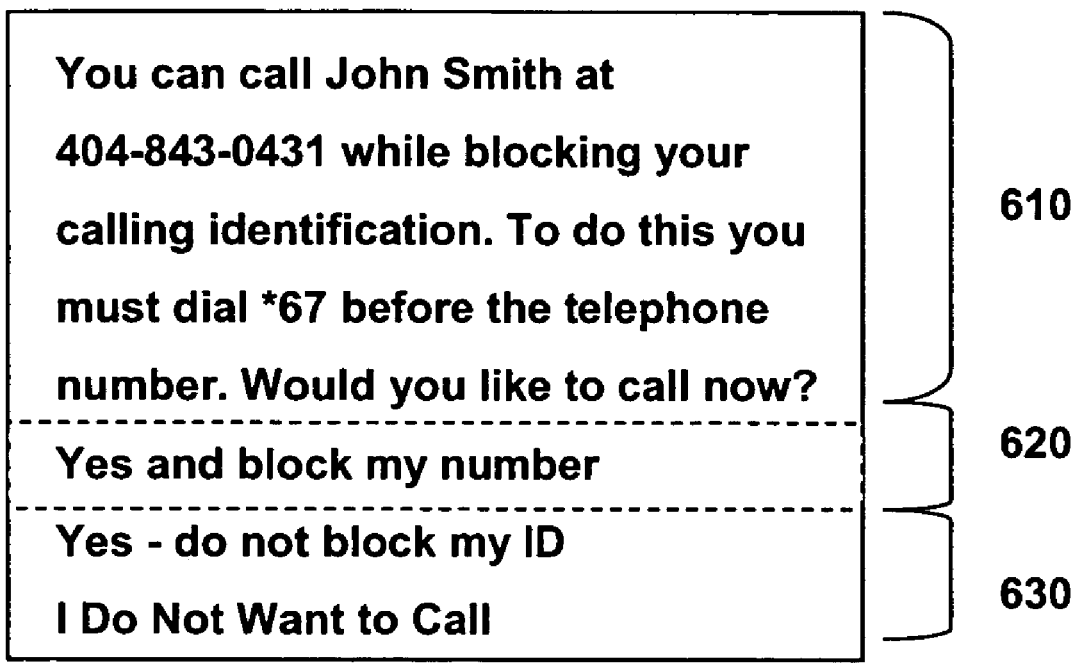
FIG. 6 is an illustration of an exemplary example of a screen providing options for allowing a mobile subscriber to contact a requesting party directly with or without revealing their identity or contact information.

FIG. 6 is an illustration of an exemplary screen that would be displayed if the mobile subscriber 1607 chose the "I will call" default option 520 in FIG. 5. The screen in FIG. 6 is broken up into several sections. Section 610 consists of a statement explaining that the mobile subscriber 1607 can contact the requesting party 1606 without revealing their identity or telephone number. Section 610 can include information on how to manually contact the requesting party 1606 without disclosing the mobile subscriber's 1625 identity. Section 610 in this example also contains a question asking the mobile subscriber 1607 if they would like to call back the requesting party 1606. Section 620 is the default selection and in this example instructs the mobile device 1625 to call the requesting party 1606 while blocking any mobile subscriber 1607 identifiable directory information Section 630 is comprised of other selections that can be chosen by the mobile subscriber 1607. In this example these selections consist of a selection that instructs the mobile device 1625 to call back the requesting party 1606 without blocking mobile subscriber 1607 identifiable directory information and a selection that allows the mobile subscriber 1607 to ignore the message.

Figure 7:
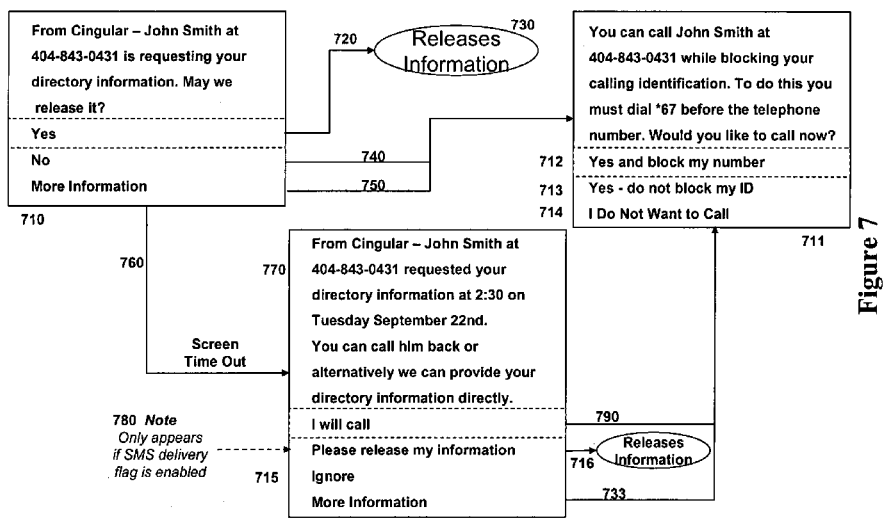
FIG. 7 is an illustration of a representative example of a flow of screens for presentation to a mobile subscriber in accordance with an exemplary embodiment of the present invention.

Turning now to FIG. 7. This Figure is an illustration of the exemplary flow of the screens displayed to the mobile subscriber 1607. Screen 710 is the initial screen. If the mobile subscriber 1607 selects the "yes" choice 720 the application will send a message to the MDMS server 1630 and the directory information will be released 730 to the requesting party 1606. If the mobile subscriber 1607 selects either the "No" 740 or "More information" 750 choice, then screen 711 will be presented explaining how to contact the requesting party 1606 while allowing the requesting party 1606 to see the mobile subscriber's 1625 directory information 713 or alternatively while blocking the mobile subscriber's 1625 directory information 712. Screen 711 also allows an option not to call back the requesting party 714.

If the mobile subscriber 1607 does not choose an option on screen 710 the screen will automatically timeout 760 and present a replacement screen 770. This screen will present options that will allow the mobile subscriber 1607 to call the requesting party 1606 directly 790 which, if selected, will present screen 711 with the options described above. The mobile subscriber 1607 can also choose to provide a delayed release of their directory information 716, ignore the message 715, or obtain more information 733. The option "Please release my information" would only be displayed if the MDMS server 1630 determined it had a valid route to send the directory information to the requesting party 1600 on a delayed basis. If the MDMS server 1630 determined that it did not have a valid route to contact the requesting party 1606 it would not display this option 780. If the mobile subscriber 1607 chooses "More information" 733 on screen 770, then screen 711 will be presented with the choices defined above.

While these screens are being presented to the mobile subscriber 1607 the other buttons and selections on the mobile device 1625 will continue to operate as normal. For example, the mobile subscriber 1607 will be able to choose to go back a screen, end the session, or interrupt the session at any point.

Turning now to FIG. 8. This Figure represents a flow diagram for an exemplary subroutine that allows the directory system 1600 or other designated entity in the network to process messages from a screened and an unscreened requesting party 1606. The subroutine starts a point B and the first step is to determine if the communications attempt 1606 is from a screened address, step 810. A requesting party 1606 can be screened by several methods. The requesting party 1606 can be screened by originating a call from a device 1606 that is known by a trusted partner or network provider, by identifying themselves via the answer to queries or challenges from the network, or by other means known to those skilled in the art. If the requesting party's 1606 address is not from a screened address the directory system 1600 will set the screened number flag to unscreened in the message to be sent to the application on the user device, step 820. If the directory assistance system determines requesting party's 1606 address is from a screened number the directory assistance system 1600 will set the screened number flag to screened, step 830, and pass a query message 1620 to the MDMS server 1630. The MDMS server 1630 will then determine the serving mobile network 1601 for the mobile subscriber 1607 whose directory information is being requested, step 840. The MDMS server 1630 will then lookup the algorithm or dialing sequence needed to block the identity of the mobile subscriber 1607 originating the call from the particular network 1601, step 850. The MDMS server 1630 then includes this code into the trigger message to be transmitted to the mobile subscriber whose directory information is being requested, step 860.

Figure 9:
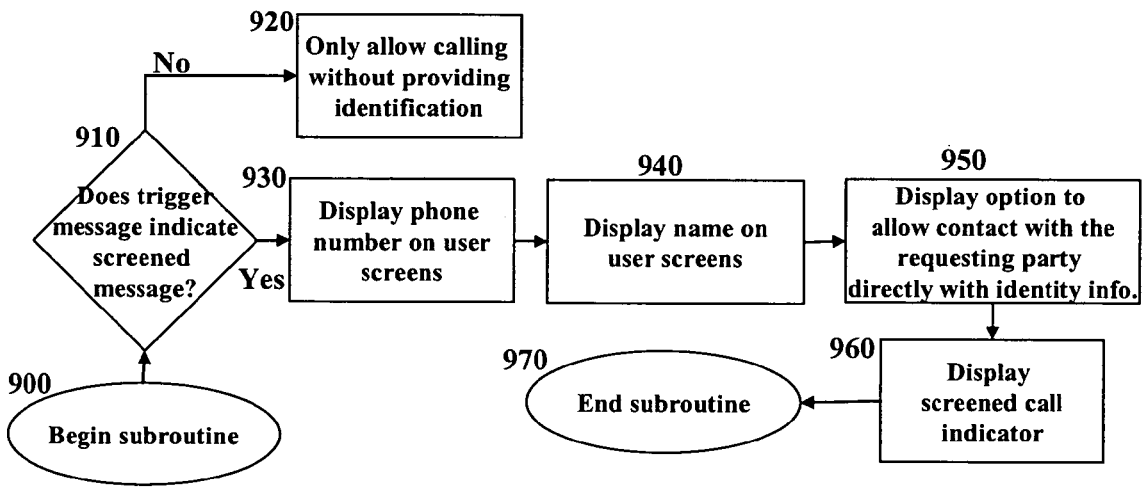
FIG. 9 is an illustration of representative logic for an application residing on the mobile subscriber's device for screening a message from a telephone number associated with a requesting party in accordance with an exemplary embodiment of the present invention.

Turning now to FIG. 9, this illustration presents an exemplary process that allows the application on the mobile subscriber's equipment 1625 to process details regarding a screened message. The application begins with the application on the mobile equipment 1625 determining if the trigger message indicates if the requesting party 1606 is originating their communications 1607 from a screened or unscreened device or location 910. If the trigger message 1670 indicates the call is not from a screened caller, the mobile equipment application 1625 can be configured to present the mobile subscriber 1607 with screens that only allows the mobile subscriber 1607 to call back while not revealing their identity, step 920. If the original request 1607 is from an unscreened party 1606, the mobile subscriber 1607 might not be allowed to release their directory information or to provide unique identifiable information if they chose to contact the requesting party 1606 directly. The application can also be configured to not reveal the calling number or name of an unscreened requesting party 1606. This will ensure that the mobile subscriber 1607 can readily identify an unscreened requesting party 1606 and will assist the mobile subscriber 1607 to only reveal as much information as desired to an unscreened party. If the original request 1607 is from a screened or trusted source, the application on the mobile subscriber's device 1625 can be configured to display the address of the requesting party 1606, display the name of the requesting party 1606, provide the option to contact the requesting party 1606 while displaying their identity, step 950, and place any other indicators in the message indicating that the requesting party 1606 identity was screened or trusted, step 960.

Figure 10:
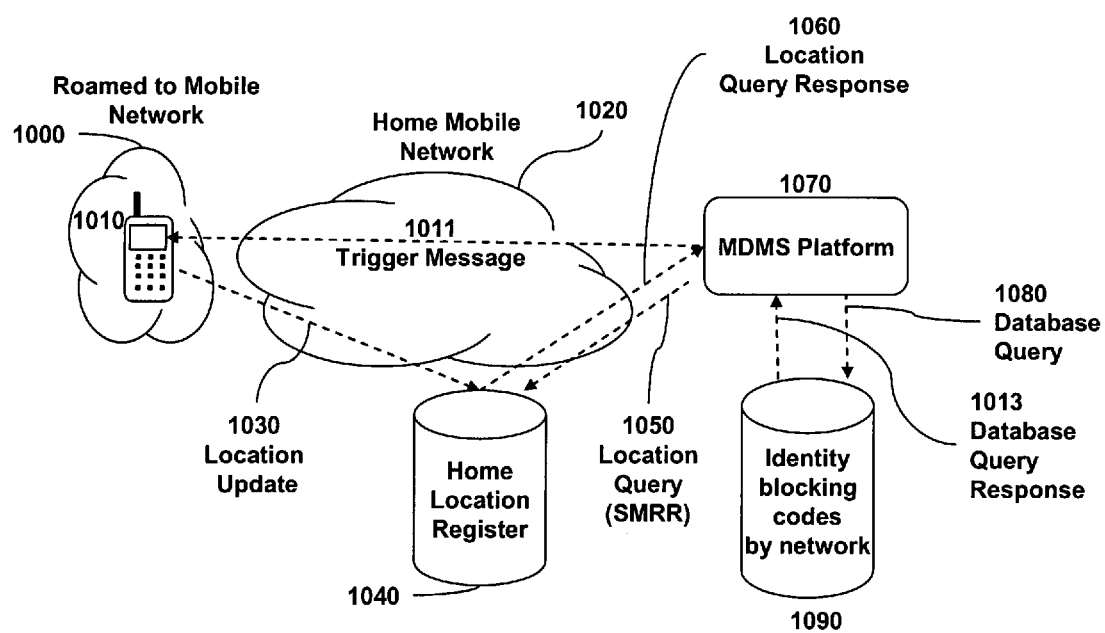
FIG. 10 is an illustration of network components and messages useful for providing the identity blocking code for the current network serving mobile equipment, in accordance with an exemplary embodiment of the present invention.

Turning now to FIG. 10, this illustration presents an exemplary network architecture having an MDMS platform 1070 that can determine the location of mobile equipment 1010 in either a home network 1020 or a visited network 1000 in order to determine a usable method of blocking the mobile equipment's 1010 or mobile subscriber's identity for a communications session. The mobile equipment first sends out a signal when arriving at a new network location 1030. This signal 1030 updates the location of the mobile equipment 1010 in the mobile subscriber database 1040. The MDMS platform 1070 then can query 1050 the mobile subscriber database 1040. The mobile subscriber database 1040 would then reply 1060 to the query with a number of parameters that may include the current location or network 1000 where the mobile equipment 1010 is located. Once this information is obtained from the mobile subscriber database 1040 in the home mobile network 1020, the MDMS platform 1070 launches a query 1080 to a database 1090 that maps the location of the mobile equipment 1010 with the code to block or hide the identity of the mobile equipment or mobile subscriber when communicating with another point on the network. The database 10.9 can be internal or external to the MDMS platform 1070 or may alternatively be a part of another network element. Once the response 1013 identity blocking or hiding code was determined, the MDMS platform 1070 could then either send a separate message 1011 to the mobile equipment containing this code or could include this code into the message 1011 sent to request permission to release the directory information to the requesting party.

Figure 11:
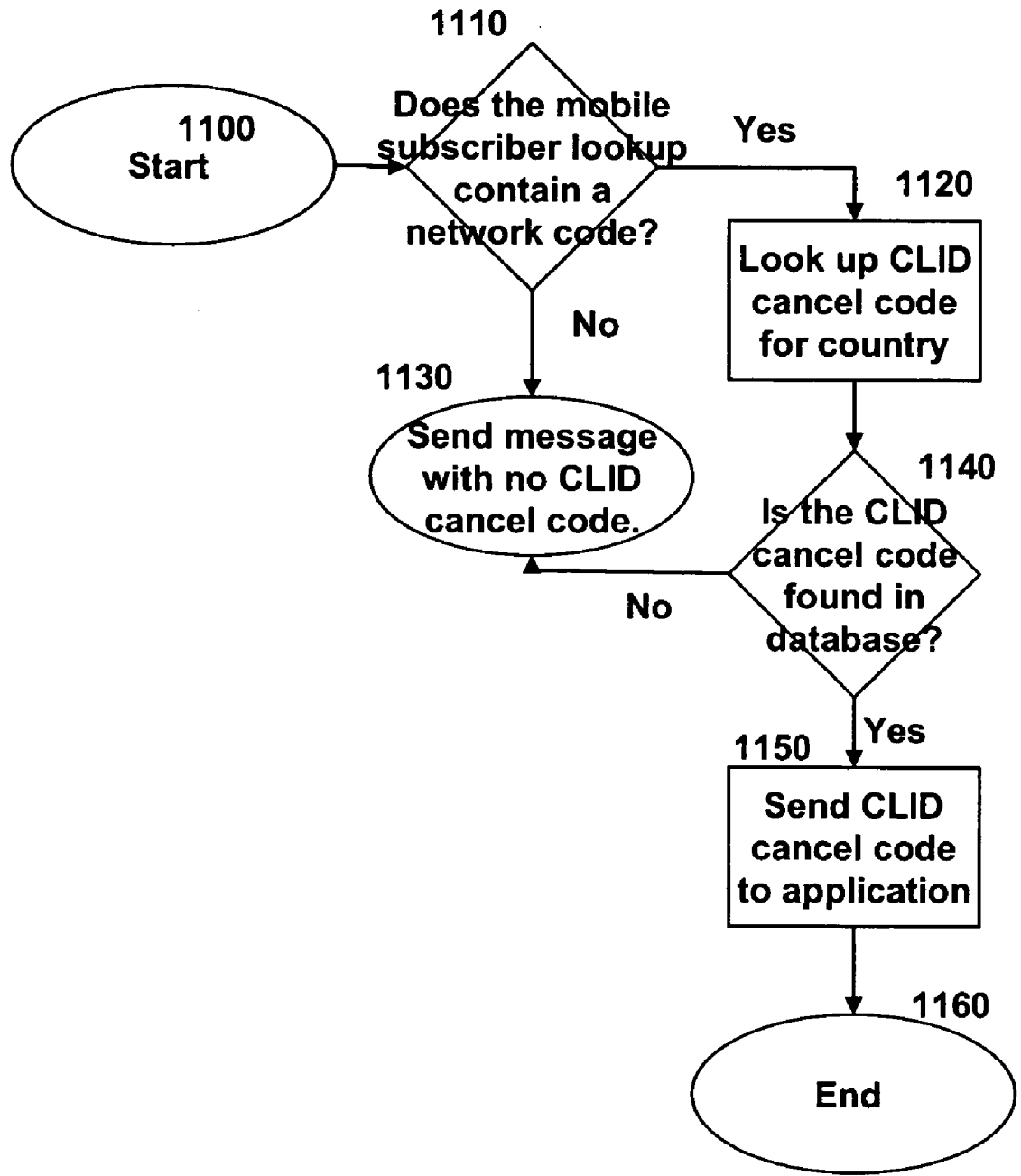
FIG. 11 is an illustration of MDMS server logic flow useful for determining the appropriate method of blocking subscriber identifiable information when a mobile subscriber attempts to directly contact a requesting party, in accordance with an exemplary embodiment of the present invention.

Turning now to FIG. 11, this illustration presents an exemplary logic flow used by the MDMS server 1630 to determine the appropriate method for the application on the mobile device 1625 to use to block their identification from another network user when contacting them directly. The exemplary logic, implemented by a subroutine, starts by looking up the mobile subscriber 1607 whose directory information is being requested on the mobile subscriber database 1605 in the home network 1601 and determining if a serving network, location, or country code is available from this lookup, step 1110. If the network code is not available the subroutine will continue with sending a permission message 1670 without an identity block code, step 1130, or with a generic identity block code. Alternatively, the application on the mobile device 1625 may have a generic identity block code stored to be used if the trigger message 1670 does not contain a valid identity block code. If the country code, network code, location information, or other similar information is available in step 1110, then the MDMS server 1630 would look up the identification block code for the given network, step 1120. The MDMS server 1630 would then determine if the identification block code was available in the database, step 1140. If this code was not available, the subroutine will continue with sending the message without an identity block code, step 1130, or with a generic identity block code. If the identification block code was available the MDMS server 1630 would then include the appropriate network block code in a trigger message 1670, step 1150, to the application on the mobile equipment, subscriber identification module, or other similar device (all of these devices are represented by 1625) that would present the information to the mobile subscriber 1607.

Figure 12:
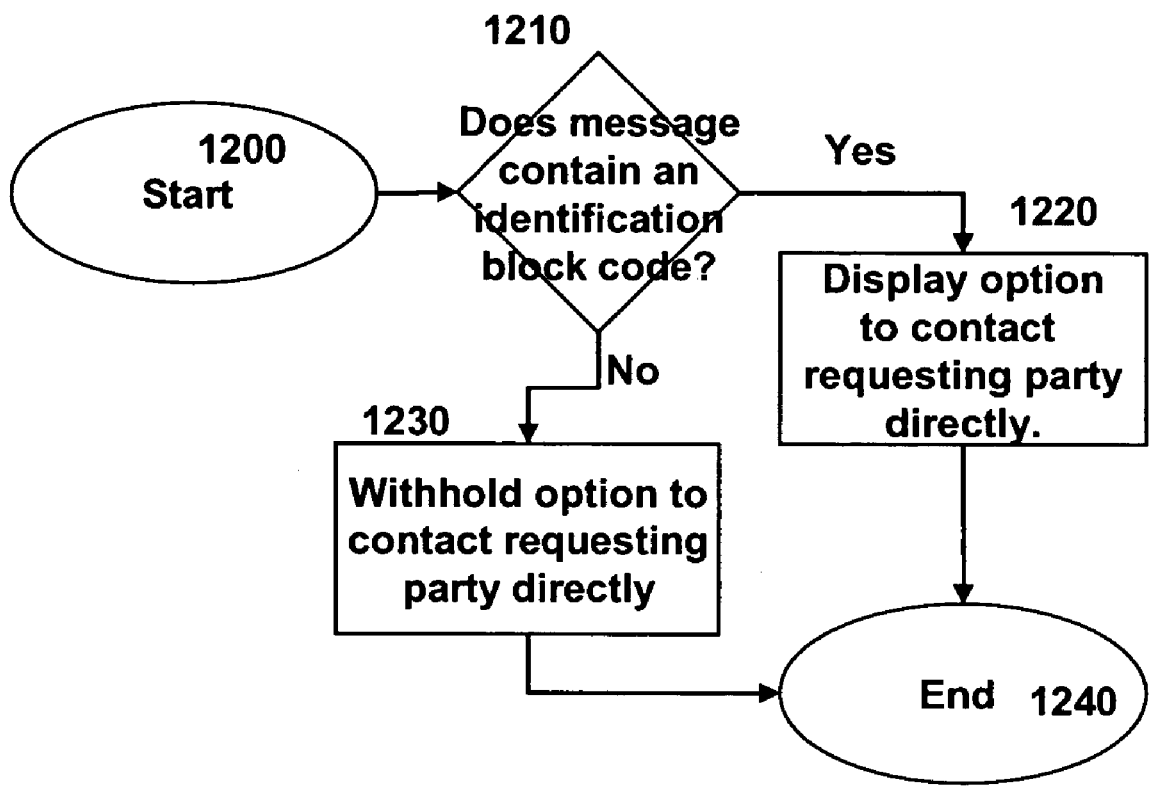
FIG. 12 is an illustration of mobile equipment logic flow for using the calling line identification (CLID) block code if available, in accordance with an exemplary embodiment of the present invention.

Turning now to FIG. 12, this illustration presents an exemplary subroutine describing the mobile equipment 1625 logic flow for using the calling line identification (CLID) block code, if present, in the message from the MDMS server 1630. The first step in this subroutine is to determine if the trigger message 1670 contains a code to block or hide the identification of the mobile equipment 1625 or the mobile subscriber

1607 when communicating directly with another network user, step 1210. If the trigger message 1670 does not contain the identification block code, the application on the mobile equipment 1625 can withhold or limit the option to allow the mobile subscriber 1607 to contact the requesting party 1606 directly, step 1230. If the trigger message 1670 contains the identification block code, the application on the mobile equipment 1625 can display the appropriate text and options to allow the mobile subscriber 1607 to contact the requesting party 1606 directly, step 1220.

Figure 13:
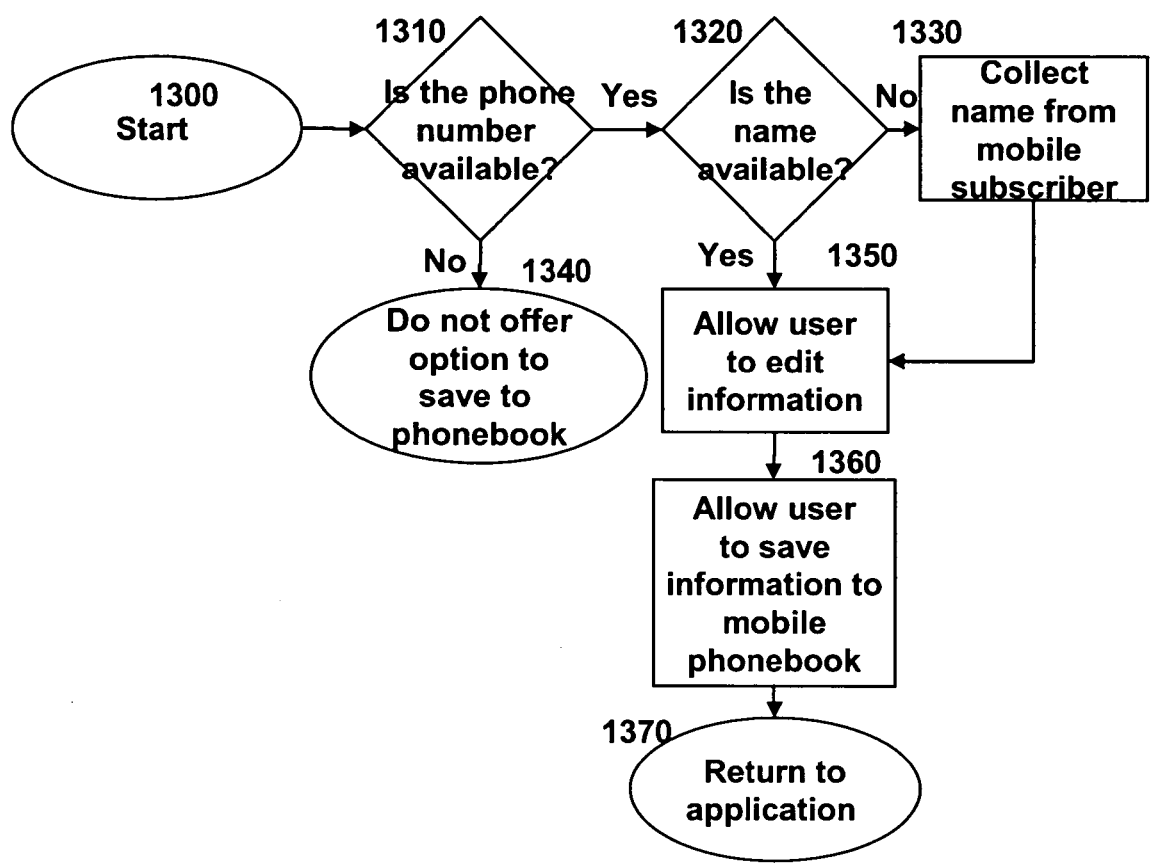
FIG. 13 is an illustration of mobile equipment logic flow for providing an option to automatically add a requesting party's information to a mobile subscriber's personal phonebook, in accordance with an exemplary embodiment of the present invention.

Turning now to FIG. 13, this illustration presents an exemplary subroutine describing the mobile equipment logic flow for automatically storing the requesting party's 1606 information into the mobile subscriber's 1607 phonebook. The subroutine starts with determining if the number of the requesting party 1606 is available, step 1310. If the number of the requesting party 1606 is not available then the application on the mobile equipment 1625 would not provide the option to store the information in the phone book, step 1340. If the number of the requesting party 1606 is available the logic would then determine if the name of the requesting party 1606 is available, step 1320. If the name of the requesting party 1606 is available, the logic of the mobile equipment 1625 application can then allow the mobile subscriber 1607 to edit the information, step 1360, before saving the information into the phonebook. This would allow a mobile subscriber 1607 to save the information in a preferred form and format and it would allow the mobile subscriber 1607 to use a similar format as their other phonebook entries. If the requesting party's 1606 name was not available or was incorrect, the logic of the application on the mobile equipment 1625 would then prompt the mobile subscriber 1607 to enter the name of the requesting party 1606, step 1330. This will allow the mobile subscriber 1607 to enter an appropriate name for the requesting party 1606 as the phonebook entry. Although step 1330 is shown in this example as a separate step, one skilled in the art can see how this step can easily be made a part of the edit step 1350. Once the mobile subscriber has been given the opportunity to edit the information, step 1350, the mobile equipment 1625 application would then allow the entry to be saved into the existing mobile subscriber 1607 phonebook, step 1360.

The subroutine depicted in FIG. 13 can be placed at any point in the application or can be made a menu choice for the mobile subscriber 1607 to select; however, it would be more effective to execute this logic after the mobile subscriber 1607 has released their directory information 1660 and 1650, called the requesting party directly 1480, 1490, or 1413, or chosen to ignore the permission request. By placing this logic after the attempt to call the requesting party 1606 directly the mobile subscriber 1607 may have collected more information on the requesting party 1606 (e.g., actual name instead of network calling name identification) and may have assigned a different priority to the requesting party 1606.

Figure 14:
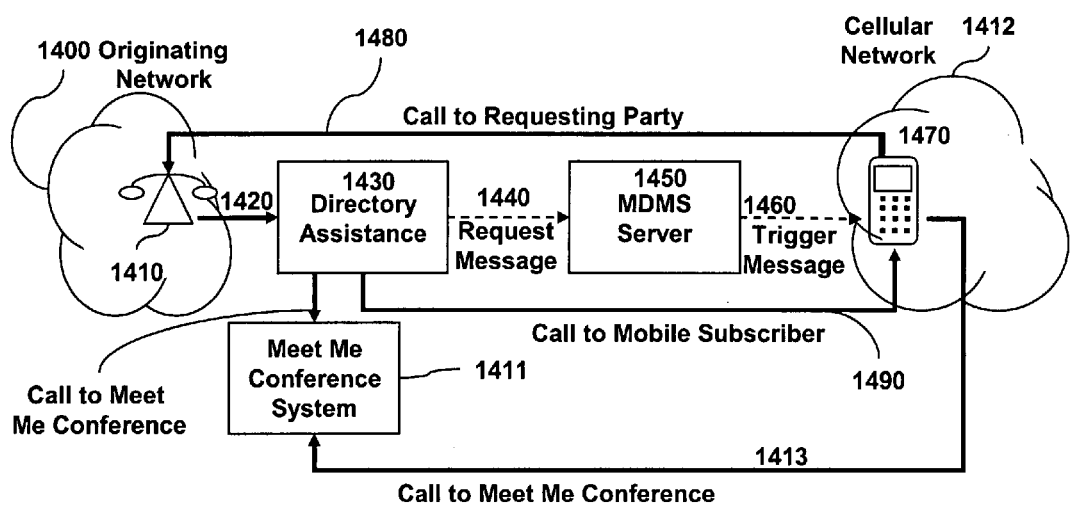
FIG. 14 is an illustration of a system supporting direct communications between a mobile subscriber and a requesting party, in accordance with an exemplary embodiment of the present invention.

FIG. 14 is a system diagram of an exemplary network, communications paths, and various options to provide a direct voice connection(s) 1490, 1413, 1480 between the requesting party 1410 and the mobile subscriber 1470 while still allowing the mobile subscriber 1470 to restrict the dissemination of their directory information and to allow the mobile subscriber 1470 to control the origination of the communication path 1490, 1413, 1480. The session starts as a normal directory call 1420 to the directory assistance platform 1430. When the directory assistance system 1430 determines that the call requires approval for release of the directory information it sends a request 1440 to the MDMS server 1450. This triggers a request for release of permission 1460 to the mobile equipment 1470. One of the options that could be displayed on the mobile equipment 1470 to the mobile subscriber would be to establish a voice path directly to the requesting party 1410. There are three different methods illustrated in FIG. 14 to achieve this goal. The first method is to allow the mobile equipment 1470 to place a call 1480 directly to the requesting party's 1410 contact number. In order to not disclose the identity of the mobile subscriber or the mobile equipment 1470 the application would prefix, to the dialing string, the outbound call with a code to block the identity of the mobile equipment 1470. The second method would be for the MDMS server 1450 to transmit a meet me conference number 1411 to the application on the mobile equipment 1470. The mobile equipment 1470 could then be programmed to place an outbound call 1413 to the meet me conference number 1411 and the directory assistance system 1430 serving the requesting party's 1410 call 1420 could either automatically forward the call 1420 to the same meet me conference port 1411 through voice channel 1405 or could alternatively the directory assistance system 1430 could monitor the meet me conference port 1411 to determine if an inbound call 1413 has been received and then forward the communications path 1420 through channel 1405. The third method would be to allow the directory assistance system 1430, upon receiving a permission message (not shown) from the MDMS server 1450, to originate a call 1490 directly to the mobile equipment 1470. The directory assistance system 1430, or other network component, could optionally be programmed to not allow the display of the mobile subscriber's 1470 directory information when this call 1490 was placed. This could be done by appending a special code to the dialing string, routing the call over a special trunk group, replacing the billing information with another string, deleting the billing information, or other similar method known to those skilled in the art.

Figure 15:
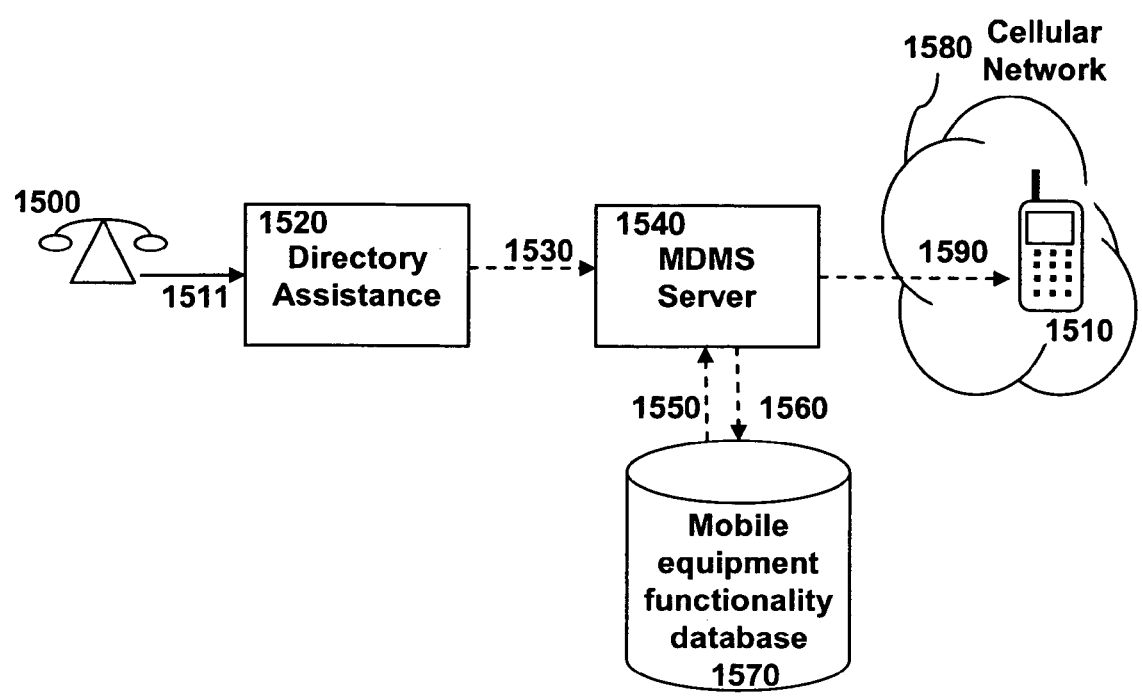
FIG. 15 is an illustration of a system having an MDMS server useful for determining an appropriate method for communicating an information request to a mobile subscriber, in accordance with an exemplary embodiment of the present invention.

FIG. 15 is a system diagram of exemplary network and communications paths to determine the appropriate method of communicating the request to the mobile equipment 1510. The logic flow begins when the requesting party 1500 originates a communications path 1511 to the directory assistance platform 1520. One skilled in the art can determine, based on the teachings of this disclosure, how the request 1511 can be a voice communications path, digital data message over a data network, wireless data message or any other similar communications means. When the directory assistance system 1520 receives the request 1511 it determines if the request is for a mobile subscriber's 1510 directory information that requires a permission release prior to releasing the directory information to the requesting party 1500. If the request 1511 requires the mobile subscriber's permission, the directory assistance system 1520 sends a directory information request 1530 to the MDMS server 1540. In order for the MDMS server 1540 to determine the best method of communicating 1590 with the mobile equipment 1510 the permission release request with the mobile equipment 1510, the MDMS server 1540 must first look up the mobile equipment 1510 and determine its capabilities on an a mobile equipment functionality database 1570. The MDMS server 1540 transmits a message 1560 to the mobile equipment functionality database 1570 and receives a response 1550 as to the features of the mobile equipment 1590. The MDMS server 1540 then formats the message 1590 in an appropriate manner to be displayed on the mobile equipment 1510. This MDMS server 1540 can optionally have a default method to transmit the message 1590 in the event the database 1570 is unavailable or does not have data on the particular mobile equipment 1510.

One skilled in the art, when considering this disclosure, can determine how the functionality illustrated in the figures and described in the disclosure can be readily performed by the other platform or elements in the described network, be incorporated into existing platforms in the network, be incorporated into new platforms, or other similar implementations without impacting the overall intent or functionality of the invention disclosed. In view of the foregoing, it can be seen that the present invention allows a mobile subscriber to designate if a requesting party can access their directory information The granting of this request can be delayed while still providing a mechanism to transmit the information to the requesting party. A display of information can be presented to the mobile subscriber in a dynamic manner. This disclosed invention can determine and handle communications sessions from trusted sources, automatically store the requesting party's information in an electronic phonebook, and allow a voice communications path between the requesting party and the mobile subscriber.

For one aspect, the present invention provides an MDMS system capable of offering information services to a requesting party within the operating environment of a wireless telephony network. This MDMS system is capable of validating a release of information about a party of interest, typically a mobile subscriber, in advance of any release of such information to a requesting party, such as a wirelessly connected subscriber. The MDMS system can support the communication of requested information between the requesting party and the party of interest via the wireless telephony network. For example, messaging can be transmitted over a text-based data or voice network to validate the information release. The status of the party of interest can be obtained by querying a customer data base prior to sending a message to that mobile subscriber. Indeed, the MDMS system can determine the best manner for sending a message to the party of interest based on information received from a customer data base query. A determination to apply answer supervision to a communication session can be based on the grant or denial of permission for the information release. Announcements can presented to the requesting party based on the status of messaging for the interested party. In the alternative, announcements can be presented as a result of information gained from the customer data base query. Information released to the requesting party can contain at least a portion of the information collected from the customer data base query.

For an alternative aspect, the present invention is capable of receiving an index number indicating a request to release contact information for a network subscriber. Permission for the information release is obtained from a network subscriber prior to releasing that information to a requesting party. Upon receiving the permission, the index number is mapped to a communications address, such as a telephone number. The communications address is then transmitted to the requesting party. Although the index number can be formatted to resemble a telephone number, the index number is not valid for reaching the network subscriber on the switched telephone network. The network subscriber can select the option of directly originating a voice conversation with the requesting party to communication the contact information. This conversation can be routed through a "meet me" conference port or number. In the alternative, the conversation can be originated by the network subscriber's mobile equipment or from a system serving the requesting party. Significantly, the identity of the network subscriber can be blocked from the requesting party in connection with the origination of this conversation. Dependent on the implementation for the conversation, the identity of the network subscriber does not necessarily appear on the requesting party's invoice in connection with that conversation.

For another aspect of the present invention, a query for information can be communicated via a wireless telephony network. A message can be transmitted to a mobile device associated with a particular mobile subscriber to gain permission to release information. The release of the information is controlled, based at least in part on the response received from the mobile device. The information is typically communicated to the original party requesting the information after the initial communications path used to make the request is terminated. The message requesting permission to release certain information typically includes user selectable options for automatically responding to the message. One option is to respond directly to the party making the initial query via a voice communications path while blocking subscriber contact information. Another option is to respond directly to the party making the initial query via a voice communications path while providing subscriber contact information. This initial message requesting permission can be replaced by a substitute message after the expiration of a time period. The substitute message contains at least one option to contact the party making the initial query directly via a voice communications channel. In the alternative, the substitute message contains at least one option that offers to automatically contact the party making the initial query via a voice communications path without providing the requested contact information. Or, the substitute message can contain information that instructs the wireless subscriber on how to manually contact the party making the initial query without providing the wireless subscriber's contact information. The information is sent to the party making the initial query via a text message or is presented to that party via a voice communications path.

For yet another aspect of the invention, a computer-implemented process can support a determination of whether a directory assistance query requesting information must be preauthorized by a network subscriber prior to any release of such information. A determination is made about the type of device used by the party that is requesting the information. For example, the device of the requesting party may not be permanently connected to the network via a wired communications path. The information can be communicated to the requesting party information via a text message or a voice message. The text messaging can be delivered after the original communications path used to make the directory assistance query has been disengaged.

Another aspect of the invention provides an MDMS system capable of offering information services to a requesting party. This MDMS system has the capability of supporting a request for permission from an owner of the information prior to releasing the information. The MDMS system supports the delayed granting of permission for the information release. The information can be sent to the requesting party via a text message or via a voice communications path. Messaging can be designed to offer multiple owner selectable options in response to the information release request. One option is to call the requesting party directly without providing subscriber contact information during the call set up. Another option is to call the requesting party directly while providing subscriber contact information during the call set up. The initial message sent to the information owner to seek permission for release of the request information can replaced by a second "replacement" message after a specified time period. A second set of options can be made available in this second message. For example, the second message can contain at least one option to contact the requesting party directly via a voice communications channel. Or, the second message can contain at least one option that offers to automatically contact the requesting party via a voice communications path without providing the requested contact information. In the alternative, the second message can contain information that instructs the wireless subscriber how to manually contact the requesting party without providing the wireless subscriber's contact information.

For yet another aspect of the invention, a process if provided for determining if a directory assistance query is requesting information that must be preauthorized by the network subscriber prior to the release of the information. A determination is made whether the requesting party is a "trusted" source. The request for release of information is communicated to the network subscriber at least in part via a messaging means. For example, the requesting party can be queried to release a restriction on their contact information. The textual information presented to the network subscriber can be altered if the requesting party is a trusted source. The textual information can include at least one menu choice. The determination that the requesting party is a trusted source can be made at least in part from network signaling information. In the alternative, the determination that the requesting party is a trusted source can be made at least in part from querying the requesting party directly. The requesting party can elect to respond to the query by deciding not to share their contact information.

For yet a further aspect, the invention can provide a method of determining if a directory assistance query is requesting information that must be preauthorized by the network subscriber prior to the release of the information. A determination is made whether the requesting party is a trusted source. At least two alternative options are communicated to the network subscriber to respond to the request for release of information. If applicable, at least one of the options presented to the network subscriber is presented as a result of the requesting party's status as a trusted source. The network subscriber can respond to the query by directly responding to the requesting party. For example, the network subscriber can respond to the query by releasing at least a portion of the subscriber's information. In the alternative, the network subscriber can respond to the query by electing to not allow a release of requested information. The requesting party can indicate that their communications address should not be shared with other network users. In the alternative, the requesting party can release their communications address to the network subscriber.

An alternative aspect of the invention provides a method of determining if a directory assistance query is requesting information that must be preauthorized by the network subscriber prior to the release of the information. The current location of the network subscriber is identified. At least one method of blocking the identity of the network subscriber is identified when an outbound communications attempt is placed from the current location. The method to block the identity of the network subscriber is transmitted to the network subscriber. The transmission of the identity block is included with a request for permission to release the directory information. The subscriber screens can be changed in response to the mobile equipment changing networks after receiving the network block code. In the alternative, the subscriber screens can be changed in response to the mobile equipment changing locations after receiving the network block code. The location of the network subscriber contains a code corresponding to the country of the network currently serving the network subscriber. The method of blocking the identity of the network subscriber can be determined at least in part by using the country identification. In the alternative, the method of blocking the identity of the network subscriber can comprise prefixing a code, such as *67, to the network address when initiating the communications attempt. A default code can be stored on in the application on the network subscriber's mobile device.

For yet another aspect of the invention, a method is provided for determining if a directory assistance query is requesting information that must be preauthorized by the network subscriber prior to the release of the information. The requesting party's information is transmitted to the mobile equipment. The requesting party's information is typically stored in the mobile subscriber's phonebook. The requesting party's information can be edited by the network subscriber prior to storing it in the phonebook. The option to store the requesting party's information can be presented to the network subscriber after the network subscriber has attempted to contact the requesting party. The requesting party's contact information can differ from the network address provided to the application to contact the requesting party. The network address to directly contact the requesting party can change if a delayed grant of permission screen is displayed.

Other modifications, features and embodiments of the present invention will become evident to those of skill in the art. It should be appreciated, therefore, that many aspects of the present invention were described above by way of example only and are not intended as required or essential elements of the invention unless explicitly stated otherwise. Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A method for offering information services, comprising the steps of
   receiving a query based on a request from a requesting party for information about a mobile subscriber of a mobile telephone network,
   responsive to the query, issuing a permission release request to a mobile communication device associated with the mobile subscriber, the permission release request seeking permission for release of the requested information on behalf of the requesting party;
   storing contact information for the requesting party in response to passage of a time period without receipt of an initial response to the permission release request for release of the requested information;
   releasing the requested information for distribution to the requesting party, based on the stored contact information for the requesting party, in response to a delayed receipt of a permission release response output by the mobile communication device after passage of the first time period, the permission release response providing permission for communication of the requested information to the requesting party.

2. The method of claim 1, wherein the permission release request is presented to the mobile subscriber as content for a first display screen of a user interface for the mobile communication device prior to passage of the time period and the permission release request is presented to the mobile subscriber as content for a second display screen of the user interface after the passage of the time period, where the content of the first display screen is different from the content of the second display screen.

3. The method of claim 1, wherein the requested information comprises at least one of location information, telephone number, address, and other information specific to the mobile subscriber.

4. The method of claim 1, wherein the permission release request comprises at least one of an identity of the requesting party and a telephone number for the requesting party.

5. The method of claim 1, wherein the permission release response is output by the mobile communication device in response to an automated decision made by logic of the mobile communication device.

6. The method of claim 1, wherein the permission release response is output by the mobile communication device in response to a decision made by the mobile subscriber based on interactions with a user interface of the mobile communication device.

7. The method of claim 1, wherein the permission release response is output by the mobile communication device in response to a decision made by the mobile subscriber as a result of a presentation by a user interface of the mobile communication device, the presentation providing an identity of the requesting party.

8. The method of claim 1, wherein the requested information is distributed to the requesting party in the form comprising one of the following: a text message transmitted to the a mobile communication device of the requesting party; an integrated voice response device (IVR) speaking the requested information to the requesting party, an operator calling the requesting party with the requested information; a web page presenting the requested information; a video message transmitted to the mobile communications device of the requesting party; a multimedia message transmitted to the mobile communications device of the requesting party; and an electronic mail message presenting the requested information.

9. The method of claim 1 wherein the step of releasing the requested information for distribution to the requesting party is completed in response to a delayed receipt of a permission release response output by the mobile communication device, after passage of the first time period and subsequent to the expiration of a second time period.

10. A method for offering information services, comprising the steps of receiving a request from a requesting party for information about a mobile subscriber of a mobile telephone network, responsive to the request, communicating with a mobile communication device associated with the mobile subscriber to seek permission for release of the requested information on behalf of the requesting party;

storing contact information for the requesting party in response to a delay in receiving a communication confirming permission for release of the requested information, the contact information defining an identifying characteristic for a communication device accessible by the requesting party; and communicating the requested information to the communication device in response to receipt of the communication confirming permission for release of the requested information, wherein the stored contact information is useful for establishing a communication with the communication device.

11. The method of claim 10 further comprising the step of presenting content associated with the communication seeking permission for release of the requested information to the mobile subscriber as a portion of a first display screen for a user interface of the mobile communication device upon receipt of the communication.

12. The method of claim 11, further comprising the step of updating a presentation of the content as a portion of a second display screen for the user interface in response to the delay in receiving the communication confirming permission for release of the requested information, wherein the content of the first display screen is different from the content of the second display screen.

13. The method of claim 10 further comprising the step of obtaining the contact information for the requesting party based on the telephone number assigned to the communication device as used by the requesting party to issue the request for information.

14. The method of claim 10 further comprising the steps of determining a type of the communication device used by the requesting party to issue the request for information and using the communication device type to assist an identification of a preferred mechanism for communicating the requested information to the communication device.

15. The method of claim 14, wherein the step of communicating the requested information to the communication device occurs only after an expiration of a predetermined time period that is initiated by communicating with the mobile communication device associated with the mobile subscriber to seek permission for release of the requested information.

16. The method of claim 10 further comprising the steps of determining a type of the network serving the requesting party and using the network type to assist an identification of a preferred mechanism for communicating the requested information to the communication device.

17. A method for controlling a release of information on behalf of a mobile subscriber of a mobile telephone network, comprising the steps of receiving a permission release request at a mobile communication device associated with the mobile subscriber, the permission release request issued by an information system that is independent of the mobile telephone network, the permission release request seeking permission for release of information about the mobile subscriber to a requesting party;

presenting a first display screen via a user interface of the mobile communication device, the first display screen comprising at least a portion of the permission release request;

presenting a second display screen via the user interface of the mobile communication only after expiration of a time period and in the absence of a decision of whether to release the requested information, the second display screen comprising identifying information about the requesting party;

responsive to the second display screen, deciding to release the requested information based on the identifying information about the requesting party; and issuing a permission release response from the mobile communication device to the information system in response to a determination to release the requested information for distribution to the requesting party, the permission release response providing permission for communication of the requested information from the information system for use by the requesting party.

18. The method of claim 17, wherein the requested information comprises at least one of location information, telephone number, address, and other information specific to the mobile subscriber.

19. The method of claim 17 wherein the second display screen presents at least one option for contacting the requesting party via a voice communications channel initiated by the mobile communications device.

20. The method of claim 17 wherein the second display screen presents at least one option that automatically contacts the requesting party via a voice communications path initiated by the mobile communications device in advance of communication of the requested information.

21. The method of claim 17 wherein the second display screen presents information instructing the mobile subscriber on options for contacting the requesting party prior to any release of requested information to the requesting party.

* * * * *